United States Patent
Tekolste et al.

(10) Patent No.: US 10,175,478 B2
(45) Date of Patent: Jan. 8, 2019

(54) METHODS AND SYSTEMS FOR GENERATING VIRTUAL CONTENT DISPLAY WITH A VIRTUAL OR AUGMENTED REALITY APPARATUS

(71) Applicant: MAGIC LEAP, INC., Dania Beach, FL (US)

(72) Inventors: Robert D. Tekolste, Charlotte, NC (US); Michael Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 56 days.

(21) Appl. No.: 14/726,424

(22) Filed: May 29, 2015

(65) Prior Publication Data

US 2015/0346490 A1    Dec. 3, 2015

Related U.S. Application Data

(60) Provisional application No. 62/005,807, filed on May 30, 2014.

(51) Int. Cl.
*G03H 1/22*     (2006.01)
*G02B 27/01*    (2006.01)
(Continued)

(52) U.S. Cl.
CPC ....... *G02B 27/0101* (2013.01); *G02B 5/1842* (2013.01); *G02B 5/1871* (2013.01);
(Continued)

(58) Field of Classification Search
CPC . G02B 5/30; G02B 5/32; G02B 5/184; G02B 6/0033; G02B 6/0035
(Continued)

(56) References Cited

U.S. PATENT DOCUMENTS 3,891,321 A    6/1975    Hock
6,166,854 A *  12/2000   Katsuma ............. G11B 7/1353
                                                   359/565
(Continued)

FOREIGN PATENT DOCUMENTS

EP         2246728         11/2010
WO    WO 2009/101236        8/2009

OTHER PUBLICATIONS

PCT International Search Report and Written Opinion for International Application No. PCT/US15/33417, Applicant Magic Leap, Inc., forms PCT/ISA/210, 220, and 237, dated Sep. 3, 2015 (14 pages).

(Continued)

*Primary Examiner* — Audrey Y Chang
(74) *Attorney, Agent, or Firm* — Vista IP Law Group LLP

(57) ABSTRACT

Several unique configurations for interferometric recording of volumetric phase diffractive elements with relatively high angle diffraction for use in waveguides are disclosed. Separate layer EPE and OPE structures produced by various methods may be integrated in side-by-side or overlaid constructs, and multiple such EPE and OPE structures may be combined or multiplexed to exhibit EPE/OPE functionality in a single, spatially-coincident layer. Multiplexed structures reduce the total number of layers of materials within a stack of eyepiece optics, each of which may be responsible for displaying a given focal depth range of a volumetric image. Volumetric phase type diffractive elements are used to offer properties including spectral bandwidth selectivity that may enable registered multi-color diffracted fields, angular multiplexing capability to facilitate tiling and field-of-view expansion without crosstalk, and all-optical, relatively simple prototyping compared to other diffractive element forms, enabling rapid design iteration.

11 Claims, 40 Drawing Sheets

(51) Int. Cl.
*G02B 27/00* (2006.01)
*G02B 5/18* (2006.01)
*G02B 27/22* (2018.01)
*G03H 1/04* (2006.01)
*G02F 1/1334* (2006.01)

(52) U.S. Cl.
CPC ..... *G02B 27/0081* (2013.01); *G02B 27/0172* (2013.01); *G02B 27/225* (2013.01); *G02B 27/2264* (2013.01); *G02F 1/1334* (2013.01); *G03H 1/0408* (2013.01); *G02B 2005/1804* (2013.01); *G02B 2027/0109* (2013.01); *G02B 2027/0123* (2013.01); *G02B 2027/0125* (2013.01); *G02B 2027/0134* (2013.01)

(58) Field of Classification Search
USPC ............ 359/15, 34, 569, 576; 385/37; 345/8
See application file for complete search history.

(56) References Cited

U.S. PATENT DOCUMENTS

| | | | | |
|---|---|---|---|---|
| 6,525,847 B2* | 2/2003 | Popovich | ................ | G02B 5/32 348/51 |
| 6,651,886 B2* | 11/2003 | Gurevich | ........... | G06K 7/10663 235/454 |
| 8,396,339 B2* | 3/2013 | Mukawa | .............. | G02B 6/0033 349/11 |
| 8,493,662 B2* | 7/2013 | Noui | .................... | G02B 6/0035 349/11 |
| 8,743,442 B2* | 6/2014 | Mukawa | .............. | G02B 5/1814 359/13 |
| 2006/0193021 A1* | 8/2006 | Ishimoto | .............. | G03H 1/0252 359/2 |
| 2012/0218481 A1 | 8/2012 | Popovich et al. | | |
| 2014/0003762 A1 | 1/2014 | Macnamara | | |
| 2014/0140654 A1* | 5/2014 | Brown | ................. | G02B 5/1814 385/10 |
| 2014/0176528 A1 | 6/2014 | Robbins | | |
| 2014/0340749 A1* | 11/2014 | Yamada | .................... | G02B 5/30 359/492.01 |
| 2016/0327795 A1* | 11/2016 | Jarvenpaa | .......... | G02B 27/0172 |

OTHER PUBLICATIONS

Extended European Search Report for EP Patent Appln. No. 15799061.5, dated Jan. 8, 2018 (9 pages).

Response to Extended European Search Report for EP Patent Appln. No. 15799061.5, dated Aug. 3, 2018 (17 pages).

* cited by examiner

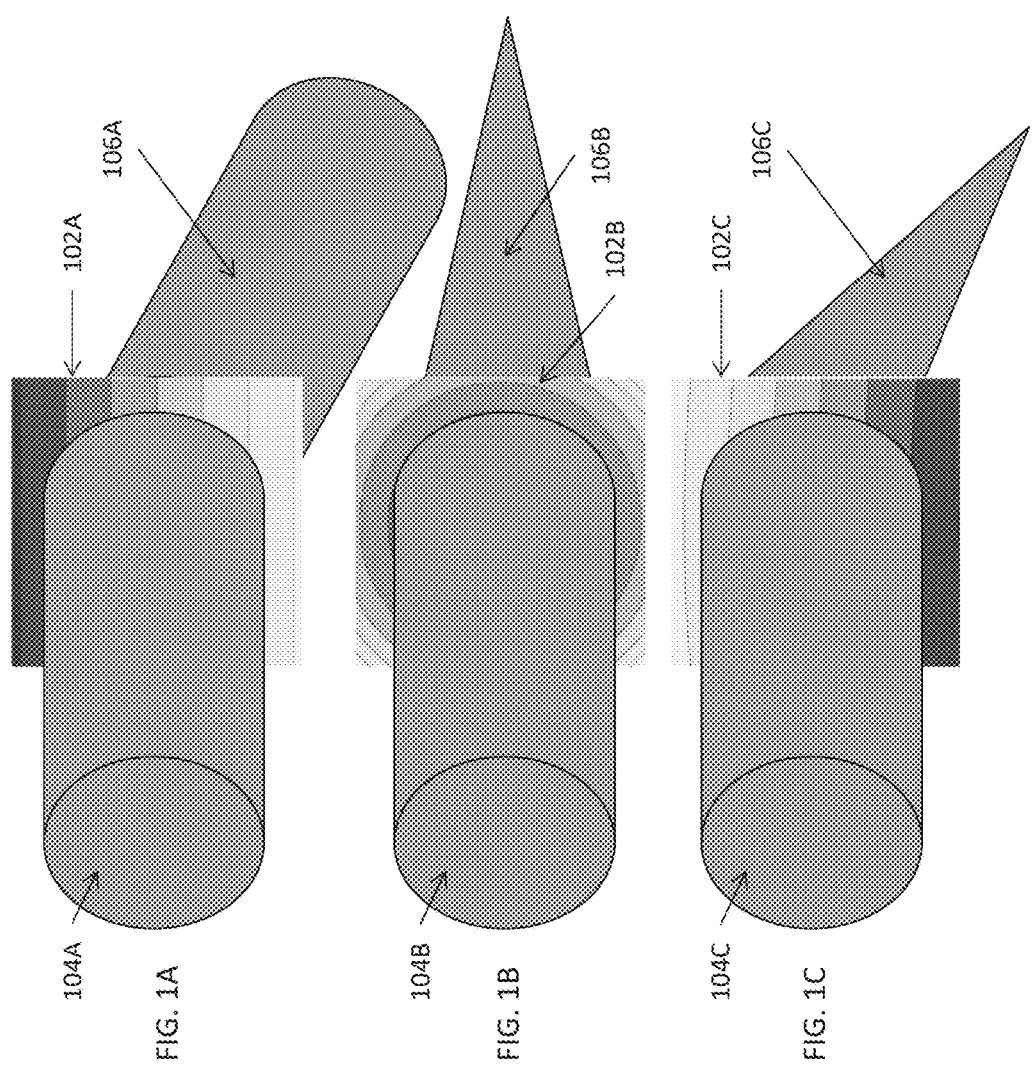

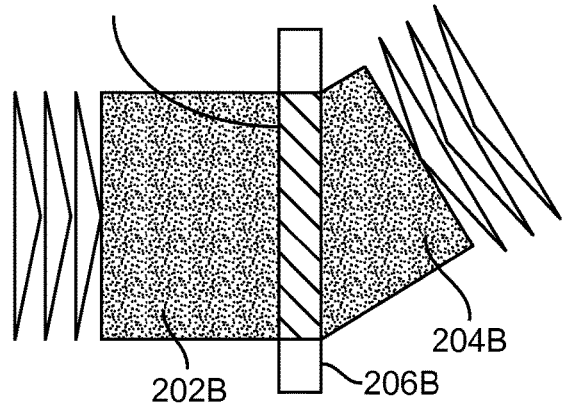
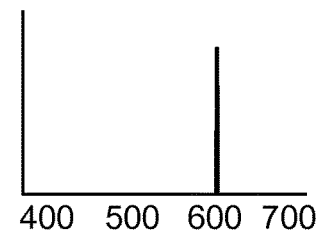
FIG. 2A
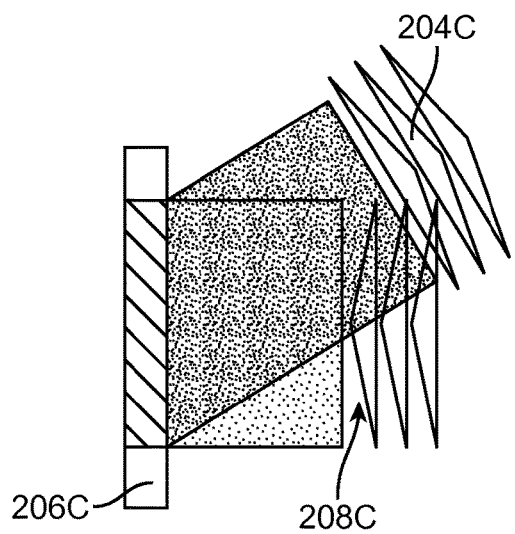
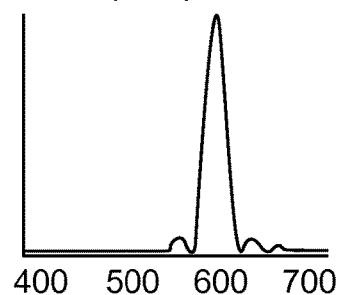
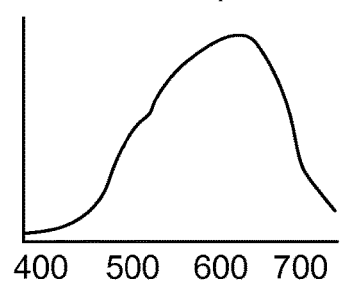
FIG. 2B

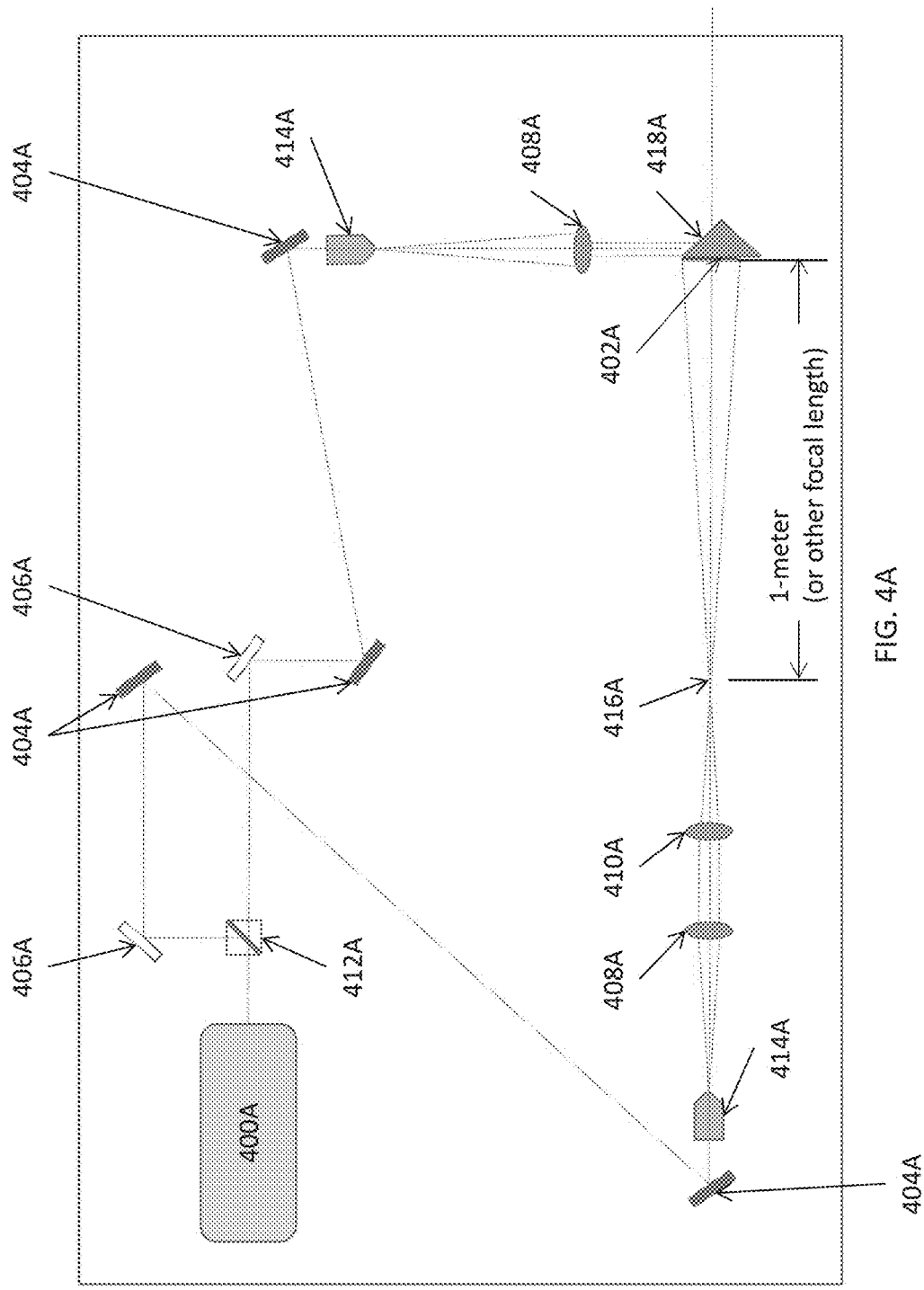

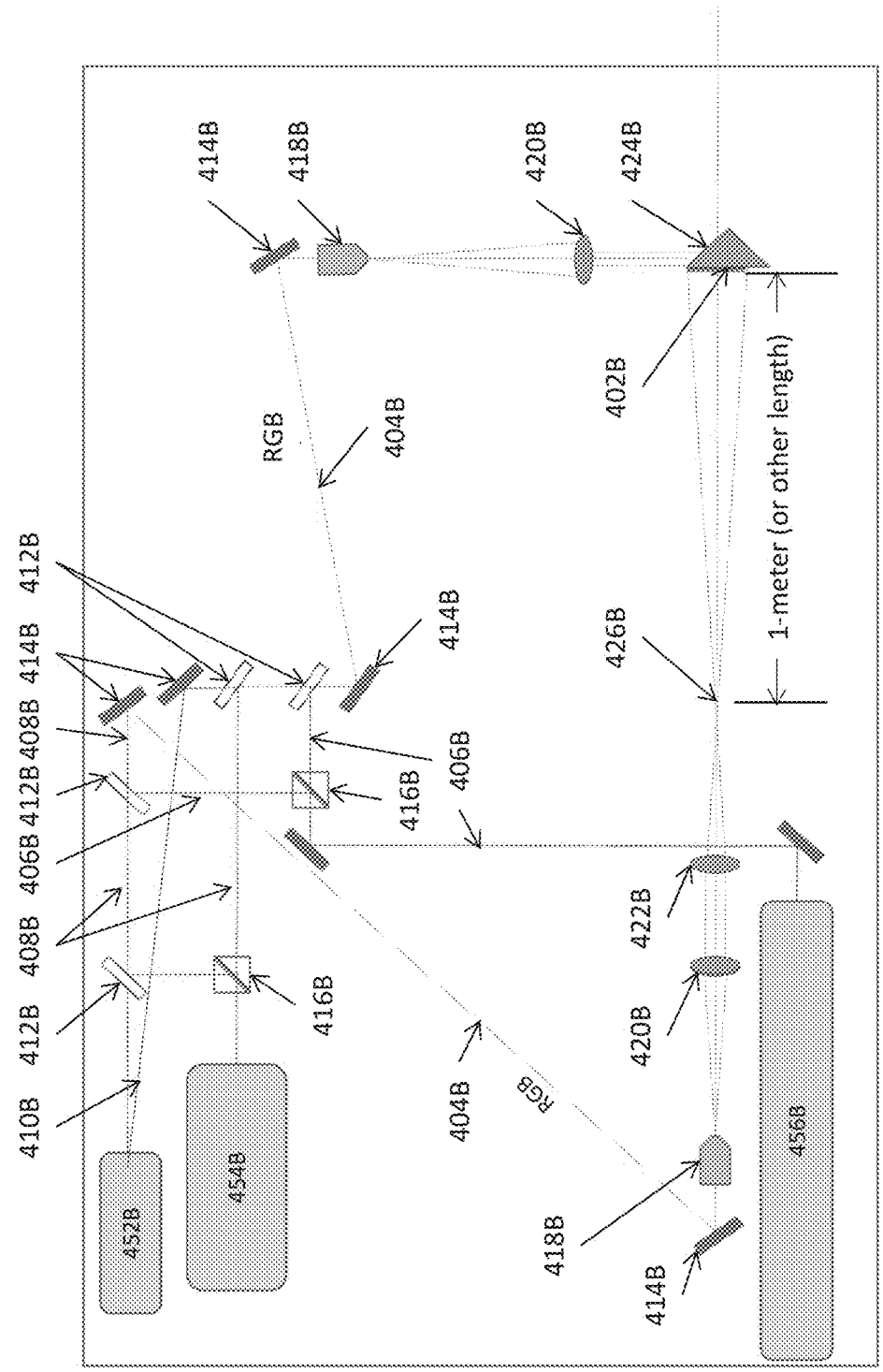

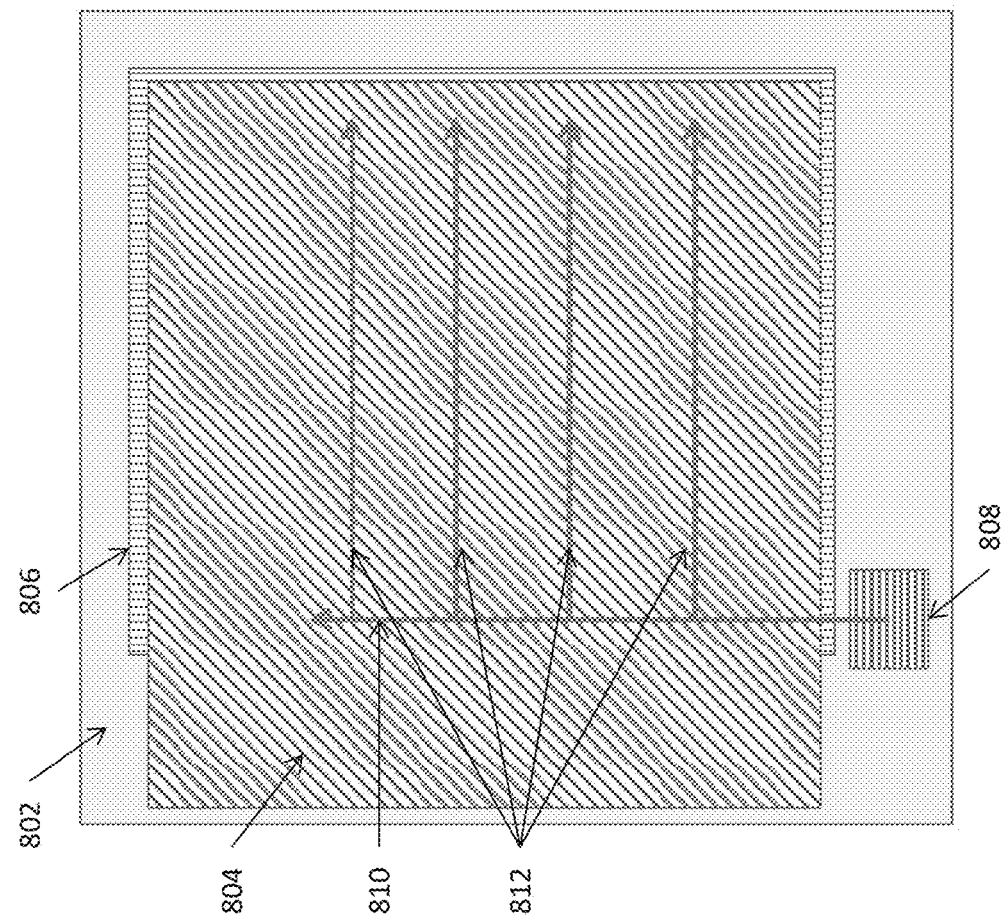
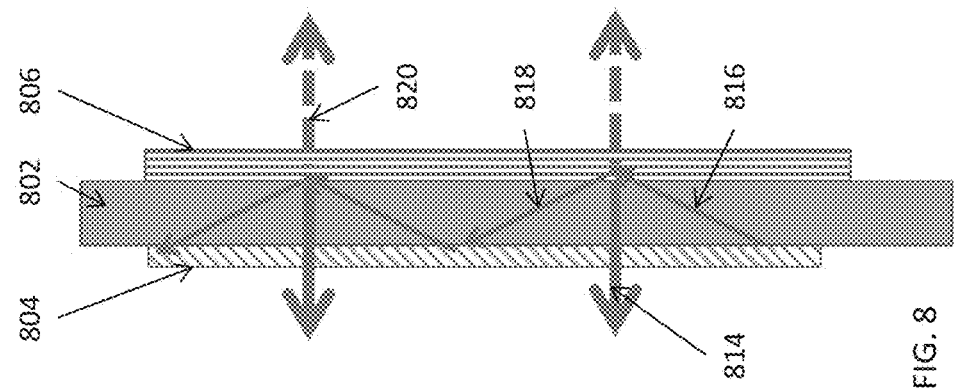
FIG. 8

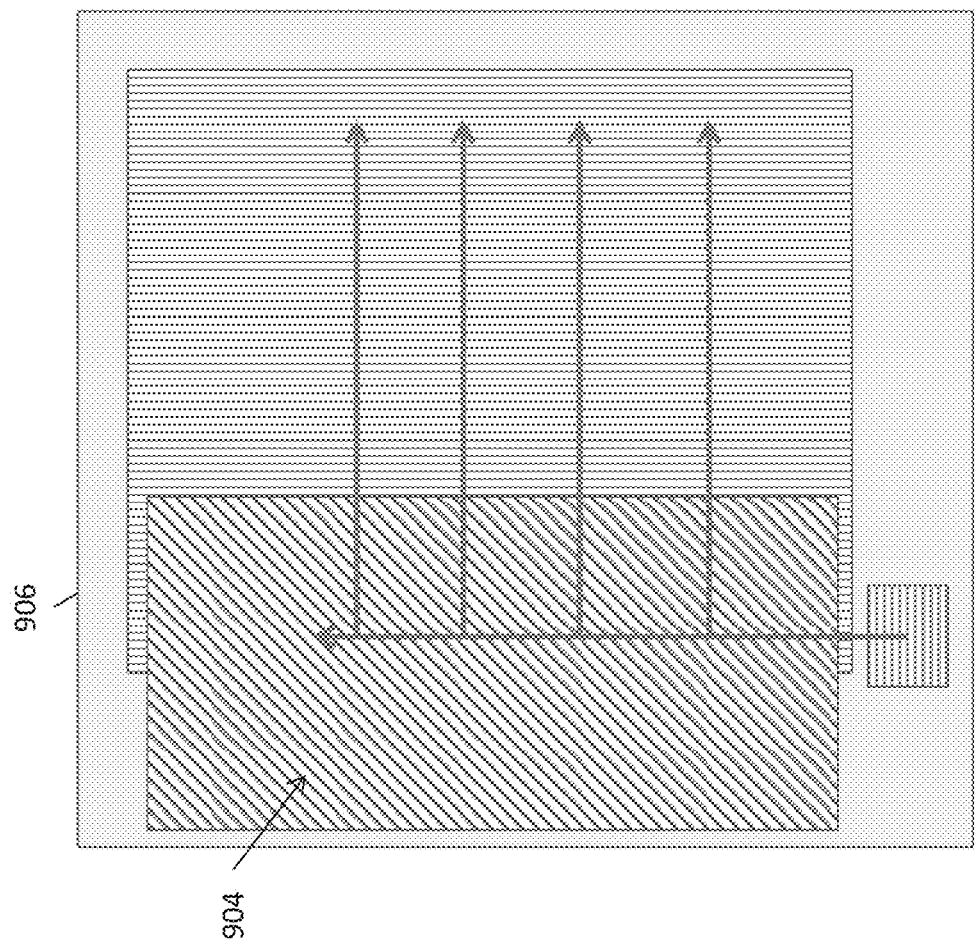

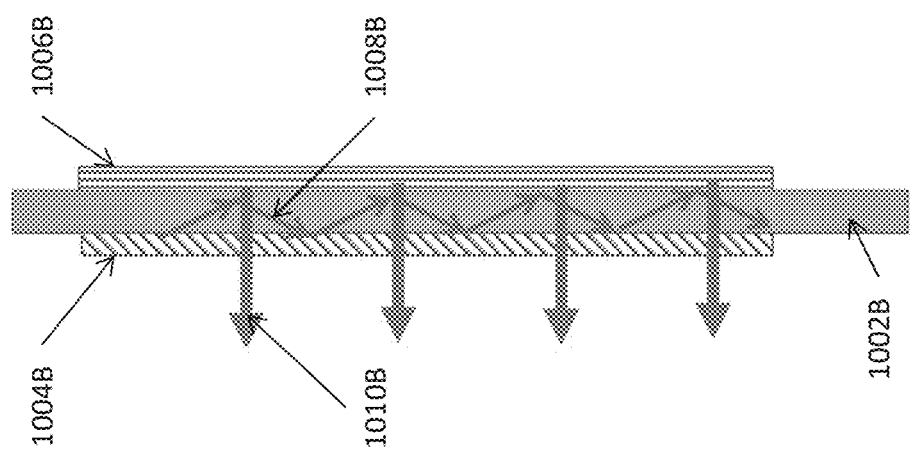
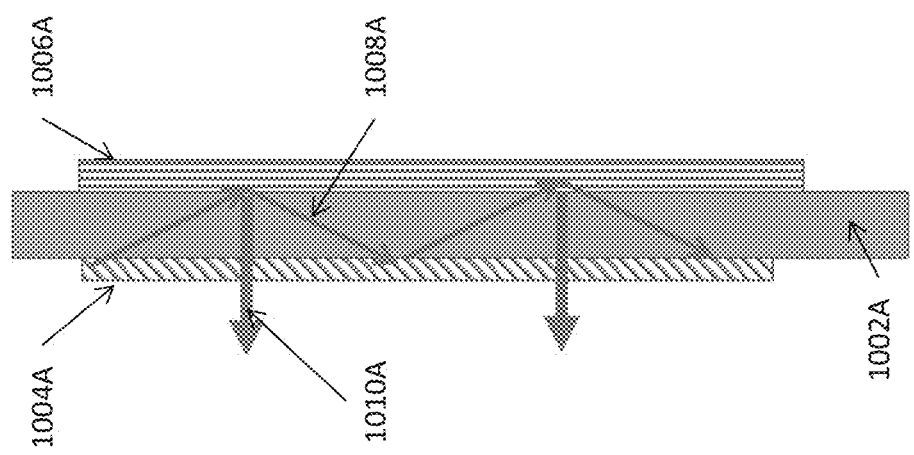

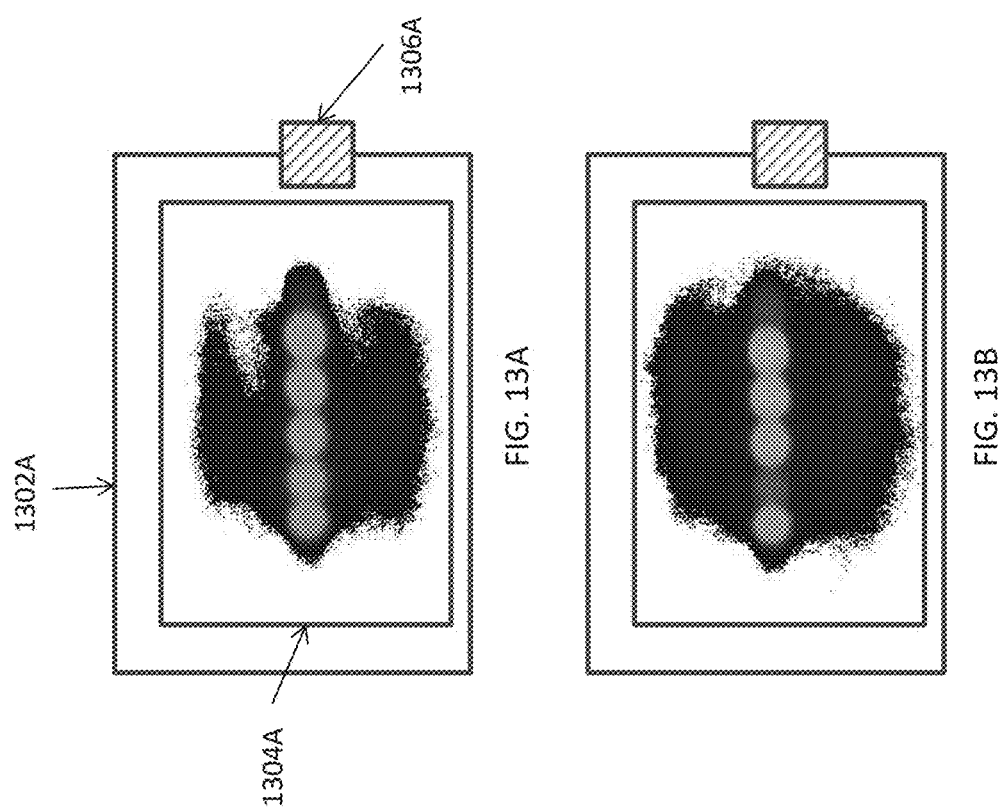

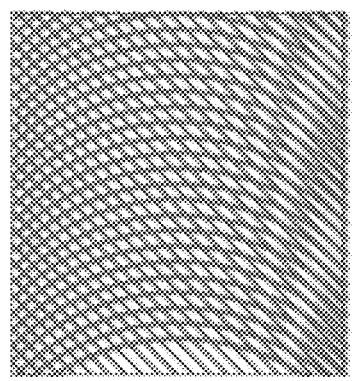
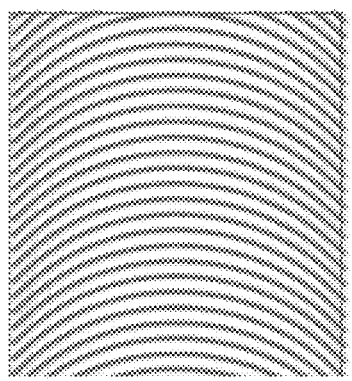
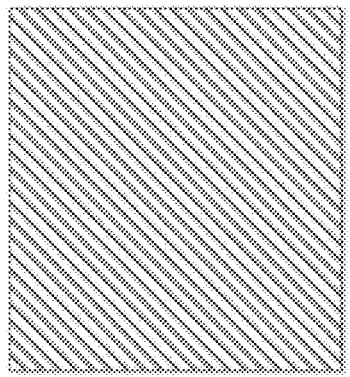
FIG. 14

2500B

2512B GUIDING PROPAGATION OF THE INPUT LIGHT BEAMS BY AT LEAST SUCCESSIVELY REDIRECTING FIRST LIGHT WAVE-FRONTS OF AT LEAST THE FIRST PORTION OF THE INPUT LIGHT BEAMS & OUT-COUPLING WITH AT LEAST THE SECOND PORTION OF THE INPUT LIGHT BEAMS VIA TOTAL INTERNAL REFLECTION

2514B CONTROL EARLIER & LATER INTERACTIONS BETWEEN THE INPUT LIGHT BEAMS AND THE FIRST GRATINGS AND / OR THE SECOND GRATINGS BY AT LEAST RAMPING A DIFFRACTION EFFICIENCY OF ONE OR MORE COMPONENTS IN THE EYEPIECE WITH DIFFERENT DIFFRACTION EFFICIENCIES

2516B DISTRIBUTE A GRATING DIFFRACTION EFFICIENCY FOR THE FIRST AND / OR THE SECOND GRATINGS BY AT LEAST MODULATING RECORDING BEAM INTENSITIES OR A RATIO OF THE RECORDING BEAM INTENSITIES IN PREPARING THE FIRST AND / OR THE SECOND GRATINGS

2518B PROVIDE TIME-MULTIPLEXED DISTRIBUTION OF PROJECTED IMAGES TO MULTIPLE FOCAL-PLANE IMAGING ELEMENTS BY USING SWITCHABLE GRATING STRUCTURES FOR THE FIRST AND / OR THE SECOND GRATINGS

2520B IDENTIFY POLYMER-DISPERSED LIQUID CRYSTAL (PDLC) COMPONENTS FOR THE FIRST AND / OR THE SECOND GRATINGS

FIG. 25C

METHODS AND SYSTEMS FOR GENERATING VIRTUAL CONTENT DISPLAY WITH A VIRTUAL OR AUGMENTED REALITY APPARATUS

CROSS-REFERENCE TO RELATED APPLICATION(S)

This application claims the benefit of U.S. provisional patent application Ser. No. 62/005,807 filed on May 30, 2014 entitled "METHODS AND SYSTEMS FOR VIRTUAL AND AUGMENTED REALTY". This application is cross-related to U.S. Prov. Patent Application Ser. No. 61/909,174 filed on Nov. 27, 2013 and entitled "VIRTUAL AND AUGMENTED REALITY SYSTEMS AND METHODS", and U.S. Provisional Patent Application Ser. No. 61/845,907 filed on Jul. 12, 2013. The content of both provisional U.S. patent applications is hereby expressly incorporated by reference in its entirety. This application is also related to U.S. patent application Ser. No. 14/690,401 filed on Apr. 18, 2015 and entitled "SYSTEMS AND METHODS FOR AUGMENTED AND VIRTUAL REALITY" and U.S. patent application Ser. No. 14/555,585 filed on Nov. 27, 2014 and entitled "VIRTUAL AND AUGMENTED REALITY SYSTEMS AND METHODS".

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

When placing digital content (e.g., 3-D content such as a virtual chandelier object presented to augment a real-world view of a room, or 2-D content such as a planar/flat virtual oil painting object presented to augment a real-world view of a room), design choices may be made to control behavior of the objects. For example, the 2-D oil painting object may be head-centric, in which case the object moves around along with the user's head (e.g., as in a Google Glass approach); or the object may be world-centric, in which case it may be presented as though it is part of the real world coordinate system, so that the user may move his head or eyes without moving the position of the object relative to the real world.

When placing virtual content into the augmented reality world presented with an augmented reality system, whether the object should be presented as world centric (i.e., the virtual object stays in position in the real world so that the user may move his body, head, eyes around it without changing its position relative to the real world objects surrounding it, such as a real world wall); body, or torso, centric, in which case a virtual element may be fixed relative to the user's torso, so that the user may move his head or eyes without moving the object, but such movement is slaved to torso movements; head centric, in which case the displayed object (and/or display itself) may be moved along with head movements, as described above in reference to Google Glass; or eye centric, as in a "foveated display" configuration wherein content is slewed around as a function of what the eye position is.

Some conventional approaches uses optical waveguides having surface relief type diffractive elements (e.g., linear gratings) to redirect light beams from an image source to provide pupil expansion and to produce virtual content display to an observer's eye (in a monocular arrangement) or eyes (in a binocular arrangement). These waveguides having surface-relief type diffractive elements require complex designs of digital diffractive patterns. These complex designs are subsequently converted into high resolution binary mask information and then exposed onto a reticle or transferred to an electronic-beam writing device (e.g., lithographic writing equipment). These digital diffractive patterns are then authored or printed into a photoresist material and subsequently etched using various etching techniques. Such surface relief type diffractive elements are not only costly to manufacture, but the resulting structures are also fragile and vulnerable to inadvertent damages or contamination due to the existence of microscopic relief structures.

Thus, there exists a need for methods and apparatus having enhanced diffractive elements for displaying virtual content for virtual or augmented reality.

SUMMARY

Disclosed are a method and a system for virtual and augmented reality. Some embodiments are directed at an apparatus for virtual and augmented reality devices and applications. The apparatus may include an eyepiece including a diffractive optical element (DOE) having one or more layers, an in-coupling optic (ICO) element that receives light beams from, for example, a projector and transmits the light beams to a substrate in the DOE. Each layer may include OPE (orthogonal pupil expansion) diffractive elements and EPE (exit pupil expansion) diffractive elements. The OPE diffractive elements on a layer deflect some of the input light beams to the EPE diffractive elements which in turn deflect some of the deflected light beams toward the user's eye(s). It shall be noted that although the use of the term "gratings" does not imply or suggest that the diffractive structures in the "gratings" include only linear diffractive elements or structures. Rather, gratings (e.g., EPE gratings, OPE diffractive elements, etc.) may include linear diffractive structures, circular diffractive structures, radially symmetric diffractive structures, or any combinations thereof. The OPE diffractive elements and the EPE diffractive elements may include both the linear grating structures and the circular or radially symmetric diffractive elements to both deflect and focus light beams.

The OPE diffractive elements and the EPE diffractive elements may be arranged in a co-planar or side-by-side manner on a layer in some embodiments. The OPE diffractive elements and the EPE diffractive elements may be arranged in a folded or overlaid manner on both sides of a layer in some embodiments. In some other embodiments, the OPE diffractive elements and the EPE diffractive elements may be arranged and recorded in a single, unitary, spatially-coincident layer to form a multiplexed layer having the functions of both the OPE diffractive elements and the functions of the EPE diffractive elements. Multiple such layers may be stacked on top of each other to form a multi-planar configuration where each layer may host its respective focal plane associated with its respective focal length. The multi-planar configuration may provide a larger focal range, and each layer in the multi-planar configuration may be dynamically switched on and off to present images that appear at different focal lengths to viewers. The OPE and EPE diffractive elements may be of the surface-relief type diffractive elements, the volumetric-phase type diffractive elements, or a combination thereof.

Some embodiments are directed at a method for virtual and augmented reality. The method may transmit input light beams into a substrate of an eyepiece by using an in-coupling optic element, deflect the first portion of the input light beams toward second diffractive elements on a first layer of the eyepiece by using at least first diffractive elements on the first layer, and direct first exiting light beams toward a viewer's eye(s) by deflecting some of the first portion of the input light beams with the second diffractive elements on the first layer.

Some first embodiments are directed at a method for generating stereoscopic images for virtual reality and/or augmented reality. Input light beams may be transmitted into a substrate of an eyepiece by using an in-coupling optic element; a first portion of the input light beams may be deflected toward second diffractive elements on a first layer of the eyepiece by using at least first diffractive elements on the first layer; and the first exiting light beams may further be directed toward a viewer by deflecting some of the first portion of the input light beams with the second diffractive elements on the first layer in these first embodiments.

Some second embodiments are directed a process for implementing an apparatus for generating stereoscopic images for virtual reality and/or augmented reality. In these second embodiments, a first substrate may be identified (if already existing) or fabricated (if non-existent) for an eyepiece of the apparatus; first diffractive elements and second diffractive elements may be identified (if already existing) or fabricated (if non-existent) on one or more first films, wherein the first diffractive elements and second diffractive elements comprise linear diffractive elements and circular or radially symmetric diffractive elements; the one or more first films including the first diffractive elements and the second diffractive elements may be disposed on the first substrate; and an in-coupling optic element may also be integrated into the eyepiece to transmit input light beams from an input light source into the first substrate, wherein the first diffractive elements and the second diffractive elements are operatively coupled to the in-coupling optic element to deflect at least a portion of the input light beams.

Some third embodiments are directed at a process for using or devising an apparatus for generating stereoscopic images for virtual reality and/or augmented reality. In these third embodiments, input light beams may be received from an in-coupling optical device; a first portion of the input light beams from the in-coupling optical device may be deflected into a first direction toward second diffractive elements with first diffractive elements in an eyepiece of the apparatus, wherein the first diffractive elements have a predetermined diffraction efficiency and a first orientation relative to a direction of propagation of the input light beams; and a second portion of the input light beams may be propagated through the second diffractive elements having a second orientation to produce stereoscopic images to an observer.

Some fourth embodiments are directed at an apparatus for generating stereoscopic images for virtual reality and/or augmented reality. The apparatus comprises an eyepiece including a substrate; an in-coupling optic element to transmit input light beams into the substrate; and a first layer of the substrate comprising first diffractive elements and second diffractive elements that are operatively coupled to the in-coupling optic element and are disposed on one or more sides of the substrate, wherein the first diffractive elements and the second diffractive elements comprise linear diffractive elements and circular or radially symmetric diffractive elements.

More details of various aspects of the methods and apparatuses for generating stereoscopic images for virtual reality and/or augmented reality are described below with reference to FIGS. 1A-25D.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1A illustrates a simplified, schematic view of linear diffraction diffractive elements that deflects collimated light beam.

FIG. 1B illustrates a simplified, schematic view of radially symmetric diffractive elements that deflects collimated light beam.

FIG. 1C illustrates some embodiments described herein that include diffractive elements combining linear and radial structures.

FIGS. 2A-B illustrate some schematic representations of making and using volumetric phase diffractive elements in some embodiments.

FIGS. 4A-C illustrate some schematic setups for recording volumetric phase diffractive elements or volumetric phase steep angle diffractive elements to fabricate EPEs, OPEs and/or combination EPE/OPEs in some embodiments.

FIG. 8 illustrates a schematic arrangement of an overlaid or folded OPE and EPE arrangement operatively coupled to an in-coupling optic device in some embodiments.

FIG. 9 illustrates another schematic arrangement of an overlaid or folded OPE and EPE arrangement operatively coupled to an in-coupling optic device in some embodiments.

FIGS. 10A-B illustrate another schematic arrangement of an overlaid or folded OPE and EPE arrangement in some embodiments.

FIGS. 13A-B illustrate schematic representations of a switchable layer in some embodiments.

FIG. 14 illustrates a schematic representation of a multiplexed expander element in some embodiments.

FIGS. 25B-D jointly illustrate some additional, optional acts 2500B that may be individually performed or jointly performed in one or more groups for the process of generating stereoscopic images for virtual reality and/or augmented reality illustrated in FIG. 25A.

DETAILED DESCRIPTION

Various embodiments of the invention are directed to methods and systems for generating virtual content display virtual or augmented reality in a single embodiment or in some embodiments. Other objects, features, and advantages of the invention are described in the detailed description, figures, and claims.

Some embodiments are directed to an apparatus for generating virtual content display. The apparatus includes diffractive elements to propagate light beams carrying image information from an image source to an observer's eye (monocular) or eyes (binocular). More specifically, the apparatus includes a first waveguide having OPE diffractive elements to deflect the light beams carrying image information from the image source to the second waveguide having EPE diffractive elements. The EPE diffractive elements in the second waveguide further redirect the light beams from the first waveguide to an observer's eye or eyes.

Figure 1D:
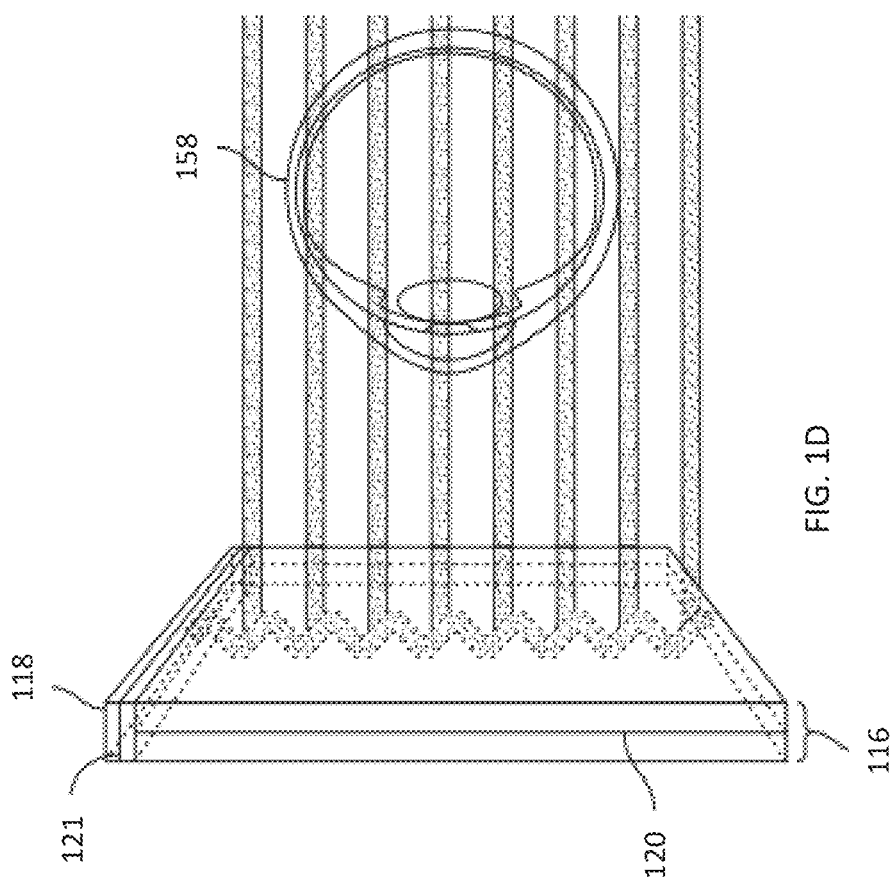
FIG. 1D illustrates an example of the interaction between diffraction patterns or diffractive elements and the light beams carrying image information for an augmented or virtual reality display apparatus.
Figure 1E:
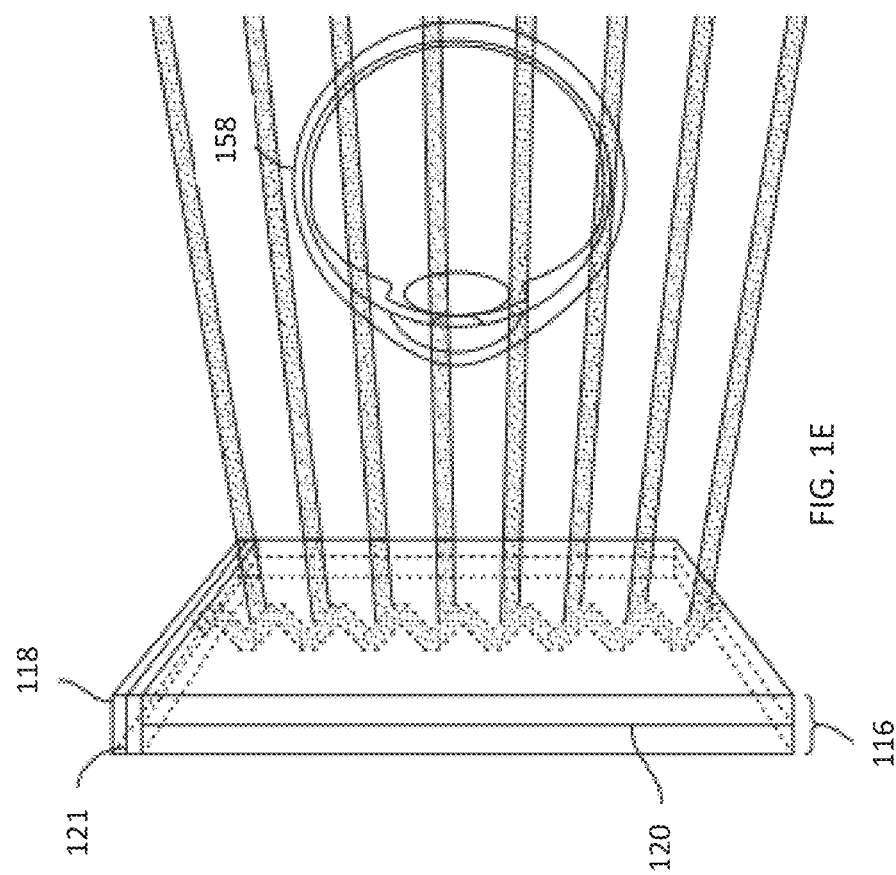
FIG. 1E illustrates another example of the interaction between diffraction patterns or diffractive elements and the light beams carrying image information for an augmented or virtual reality display apparatus.

A simplified mode of interactions between the EPE and OPE diffractive elements and the light beams for an augmented or virtual reality display apparatus may be explained with the following example with reference to FIGS. 1D-E. In this example, light carrying the image information enters a waveguide (118), and the OPE diffractive elements in the waveguide (118) may deflect the incoming light toward the DOE or EPE diffractive elements (120) in the planar waveguide (116). A diffraction pattern, a "diffractive optical element" (or "DOE"), or EPE diffractive elements (120) are embedded within a planar waveguide (116) such that as a collimated light is totally internally reflected along the planar waveguide (116), the collimated light intersects the EPE diffractive elements (120) at a multiplicity of locations. In some embodiments described herein, the EPE diffractive elements (120) have a relatively low diffraction efficiency so that only a portion of the light is deflected away toward the eye (158) with each intersection of the EPE diffractive elements (120) while the rest of the light continues to move through the planar waveguide (116) via total internal reflection (TIR).

The light beams carrying the image information is thus divided into a number of related light beams that exit the waveguide (116) at a multiplicity of locations and the result is a fairly uniform pattern of exit emission toward the eye (158) for this particular collimated beam bouncing around within the planar waveguide (116), as shown in FIG. 1D. The exit beams toward the eye (158) are shown in FIG. 1D as substantially parallel, because, in this example, the EPE diffractive elements (120) has only a linear diffraction pattern. Referring to FIG. 1E, with changes in the radially symmetric diffraction pattern component of the embedded EPE diffractive elements (220), the exit beam pattern may be rendered more divergent from the perspective of the eye (158) and require the eye to accommodate to a closer distance to bring it into focus on the retina and would be interpreted by the brain as light from a viewing distance closer to the eye than optical infinity.

One of the advantages of the apparatus described herein is that a virtual content display apparatus described herein may include volumetric type diffractive elements that may be manufactured in a more robust and cost effective manner, without requiring the use of lithographic and etching processes. The volumetric type diffractive elements may be fabricated (e.g., by imprinting) for one or more waveguides for the apparatus in some embodiments and thus completely eliminates various problems associated with the fabrication, integration, and use of surface relief type diffractive elements in conventional approaches. These diffractive elements may be further arranged in different arrangements for a virtual content display apparatus to serve their intended purposes as described below in greater details.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method and systems for virtual and augmented reality. In optical instruments such as a human wearable stereoscopic glasses for the application of virtual reality or augmented reality, the user's eye may be aligned with and be of a similar size to the instrument's exit pupil in order to properly couple the instrument to the eye(s) of the user. The location of the exit pupil may thus determine the eye relief, which defines the distance from the last surface of an eyepiece of the instrument at which the user's eye may obtain full viewing angle to an observer's eye(s), and thereby the field of view, of the eyepiece.

The eye relief is typically devised to be of certain distance (e.g., 20 mm) for use's comfort. If the eye relief is too large, the exiting light from the eyepiece may be lost and fail to reach the pupil. On the other hand, the view defined by the exiting light from the eyepiece or a waveguide coupled with the diffractive optical element (DOE) may be vignette if the eye relief is too small such that the exit pupil is smaller than the size of the pupil. Various embodiments described herein use volumetric phase diffractive elements with high angle diffraction to produce exit pupil expansion (EPE) structures or expanders and orthogonal pupil expansion (EPE) structures or expanders for a virtual reality or augmented reality system.

As presented in this disclosure, the production of OPE and/or EPE surface-relief structures implements design of the complex digital diffractive pattern that will perform the desired pupil expansion and out-coupling functions. The design may then be converted to high resolution binary mask information, exposed onto a reticle or transferred to a special electron-beam writing device, authored into a photoresist material, and etched using chemical techniques. The resulting structure is somewhat fragile, because it is a microscopic physical relief, vulnerable to damage and contamination that will disrupt the diffractive function.

In comparison, volume phase holograms may be authored by either piece-wise or monolithic (wide area-simultaneous) exposure of photosensitive materials (for example, photopolymers, silver halides, polymer-dispersed liquid crystal mixtures, etc.) with laser light, in a holographic (two-beam or more) approach. The special fringe orientation and spacing required or desired for these structures may be achieved through recording the holograms on thick dielectric substrates, such as glass or transparent or translucent plastic, which enable formation of fringes through index-matched coupling of the laser light in steep angle geometries. Some embodiments include the superimposed OPE/EPE combination of volumetric phase and surface relief structures.

One of the benefits of a combined element may be to utilize unique properties of both types of structures which, when combined, produce a superior function, as compared to an all-digital (e.g., all surface relief) or all-volumetric-phase approach. The recording of volumetric phase holograms is inexpensive, rapid, and more flexible than the digital design/computation/authoring approach in surface-relief structures because the volumetric phase authoring optical system may be easily reconfigured, modified, and customized using a variety of off-the-shelf components and implementation techniques. Highly sensitive, easy-to-use, dry-process photopolymer materials may also provide another advantage in using the volumetric phase techniques in producing the EPE/OPE structures.

Volumetric phase approaches possess the inherent ability to modulate diffraction efficiency without introducing unwanted or undesired artifacts. In the case of EPE and OPE functions, both the EPE and the OPE structures rely on successive redirection and out-coupling of collimated wavefronts propagating through large area waveguides via total internal reflection in some embodiments. With each interaction with the diffractive elements, some light is redirected, or coupled out of the structure entirely (as designed), resulting in a reduction in the amount of light left for successive interactions. This may result in some undesirable reduction in image field brightness distribution across the eyepiece as the light propagates from the projection injection point. To mitigate this problem, the diffraction efficiency of the eyepiece components may be ramped in some embodiments, such that the initial interaction between the light rays and the structures use less of the available light than later interactions.

Moreover, re-distribution of grating diffraction efficiency uniformity is straightforward in volumetric-phase recording methods, achieved by modulating the recording beam intensities, and/or the ratio of intensities between the two interfering beams. In contrast, surface-relief structures, being binary in nature, may not as readily be modified to achieve the same effect, particularly without introducing ghosting images, additional diffracted orders, and other unwanted or undesired artifacts. Volumetric phase-type structures may also be desired or required for polymer-dispersed liquid crystal (PDLC) components, including switchable diffractive elements that may enable time-multiplexed distribution of projected images to multiple focal-plane imaging elements. Some embodiments combine volumetric-phase approaches with PDLC and apply the combination to the OPE/EPE and the in-coupling optics (ICO).

The PDLC material includes micro-droplets that have a diffraction pattern in a host medium, and the refraction index of the host medium or the micro-droplets may be switched to an index that does not match that of the substrate. Switchable diffractive elements may also be made of materials including lithium niobate. Volumetric phase structures may be more angularly selective than surface relief structures, and thus may not as readily diffract light from external, possibly ambient sources. This may constitute another advantage for using at least some of the described embodiments in eyewear applications, where the diffractive elements may be exposed to sunlight or other light sources in addition to the intended image projection source. In addition or in the alternative, some embodiments utilize a single-layer multiplexed OPE/EPE structure whose function may be difficult or entirely impossible to produce using alternative approaches such as surface-relief type diffractive structures or elements. One of the reasons for such difficulty or impossibility may be due to the fact that surface-relief type diffractive elements are more dispersive than volumetric phase type diffractive elements, and thus may introduce crosstalk and multiple diffraction orders that could be wasteful of projection light and visually distracting. Another reason for such difficulty or impossibility is that the complexity of the required pattern or the etch depth and orientation required to produce the necessary pattern in binary form is difficult to attain.

Various embodiments entail specific volume phase holographic recording techniques and geometries for producing OPEs, EPEs, combinations of these two in separate layers, and combination of these two functions in a single layer that comprise a waveguide distribution-based eyepiece for augmented reality display. Although Bayer Bayfol holographic photopolymer may be used as the primary recording medium for the orthogonal pupil expansion and exit pupil expansion structures, various embodiments are not limited to this specific material for achieving the intended purposes or performing intended functions. Rather, various objectives, purposes, and functions are independent from any proprietary elements or characteristics of the Bayer Bayfol material. For instance, the PDLC material that was used in constructing some switchable EPEs behaved very similarly to the Bayer material in terms of photosensitivity, processing, clarity, etc. Additionally, DuPont OmniDex photopolymer materials may also be used with similar effect.

FIG. 1A illustrates a simplified, schematic view of linear diffractive elements that deflect collimated light beam. As it can be seen from FIG. 1A, linear diffractive elements 102A including a linearly arranged periodic structures diffract the collimated incident light beam 104A into the exiting light beam 106A travelling in a different direction than the incident light direction. FIG. 1B illustrates a simplified, schematic view of a radially symmetric diffractive elements that deflect collimated light beam. More specifically, the collimated, incident light beam 104B passes through a zone plate or circular diffractive elements 102B including a radially symmetric structures and become diffracted towards a "focal" point due to the radially symmetric structures of the circular diffractive elements 102B.

In these embodiments, the zone plate or circular diffractive elements 102B effectively focuses the collimated, incident light beam 104B to form the focused exiting light beam 106B. FIG. 1C illustrates some embodiments described herein that includes diffractive elements 102C combining linear and radial structures. The diffractive elements 102C both deflect and focus the incident light beam 104C to form the exiting light beam 106C. In some embodiments, circular or radially symmetric diffractive elements may be configured or devised to cause the exiting light beams to diverge.

Some embodiments use volumetric phase holograms that are authored or written by using, for example, piece-wise or monolithic (e.g., wide area-simultaneous) exposure of photosensitive materials that may include photopolymers, silver halides, polymer-dispersed liquid crystal mixtures, etc. with laser light in a holographic (two-beam or more) approach. FIGS. 2A-B illustrate some schematic representation of making and using volumetric phase type diffractive elements in some embodiments. More specifically, FIG. 2A illustrates that two laser beams or other light sources 202B and 204B (the "recording beams") intersect within a photopolymer film 206B and produce a volumetric interference pattern. The interference pattern may be permanently recorded as a phase pattern in the photopolymer 206B.

FIG. 2B illustrates some broad-band (e.g., white light) light is directed toward the diffractive elements from the direction (the opposite direction of the first recording beam in FIG. 2A) of one of the recording beams, some of the broad-band light may be refracted and deflected to travel in the same direction (the opposite direction of the second recording beam in FIG. 2A) as the second light beam 204C. Because of the refractive index of the photopolymer film 206C, only a relatively narrow band of color may be diffracted. Therefore, the exiting light beam appears approximately the same color as the recording beam that is used to record the diffractive elements. The line plot corresponding to FIG. 2A illustrates the wavelength (about 600 nanometers in this example) of the recording spectrum of the recording beams. The line plots corresponding to FIG. 2B illustrate the output spectrum of the exiting light beam 204C (also about 600 nanometers in this example) as well as the illumination spectrum of the broad-band light source 208C.

Figure 3A:
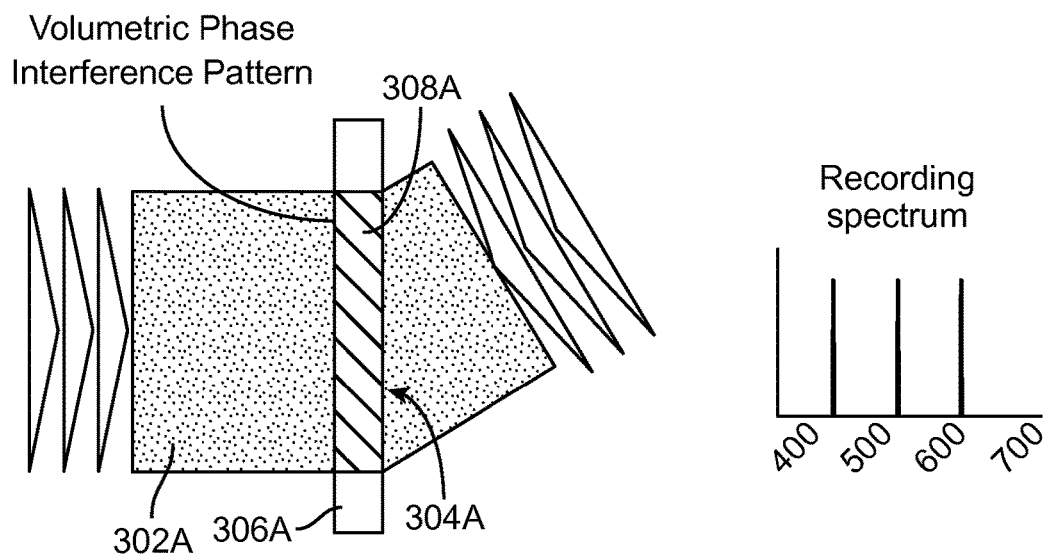
FIGS. 3A-B illustrate some schematic representations of making and using volumetric phase diffractive elements for RGB (Red, Green, and Blue) in some embodiments.
Figure 3B:
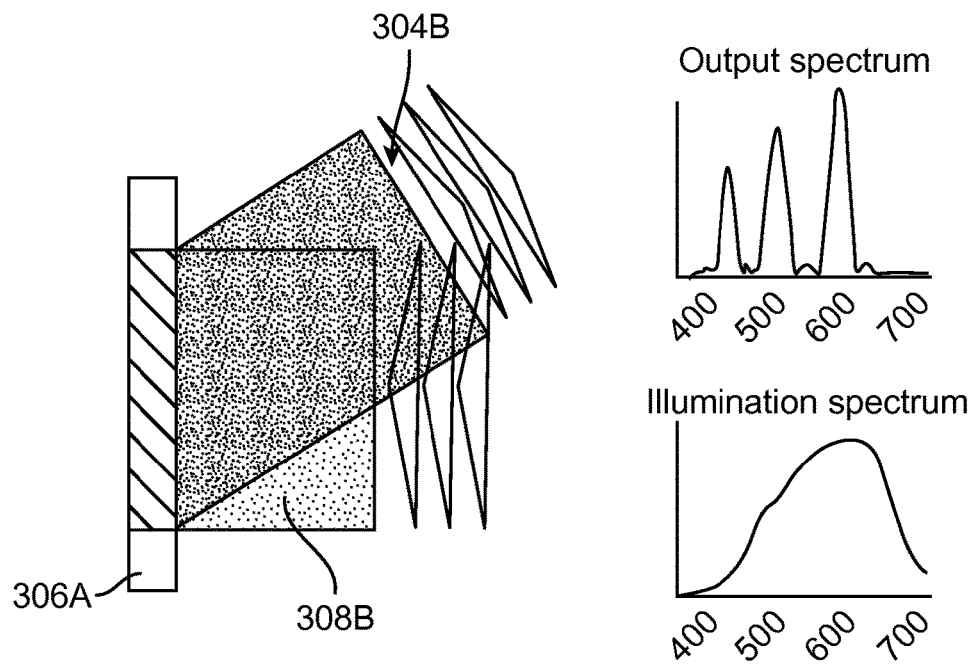

FIGS. 3A-B illustrate some schematic representation of making and using volumetric phase type diffractive elements for the three primary-color model—RGB (Red, Green, and Blue) color model—in some embodiments. More specifically, FIG. 3A illustrates the use of three recording light beams (e.g., a red laser beam, a blue laser beam, and a green laser beam) for recording the volumetric phase interference pattern in photopolymer films. Each of the three recording beams 302A and 304A records a separate superimposed diffractive elements 308A within the photopolymer film 306A in an identical or substantially similar manner as that described for monochromatic recording light beam in FIGS. 2A-B.

FIG. 3B illustrates an example of a use case when broad-band light 308B (e.g., white light) is directed toward a fabricated RGB diffractive elements 306A. Due to the wavelength selective nature of the RGB diffractive elements 306A, each color of the broad-band light is diffracted by its own diffractive elements of the RGB diffractive elements 306A. Consequently, only a narrow color band of each color may be diffracted when the broad-band light passes through the RGB diffractive elements 306A. Therefore, the exiting light beam for an incident light beam component (e.g., red, blue, or green) appears approximately the same color as the incident recording light beam component that is used to record the diffractive elements.

As a result, the exiting light beam 304B appears approximately full color as a result. The line plot corresponding to FIG. 3A illustrates the wavelengths of the recording spectrum of the recording beams having three peaks that respectively represent the red, green, and blue light components of the recording light beam. The line plots corresponding to FIG. 3B illustrate the output spectrum of the exiting light beam 304B as well as the illumination spectrum of the broad-band light source 308B.

Figure 3C:
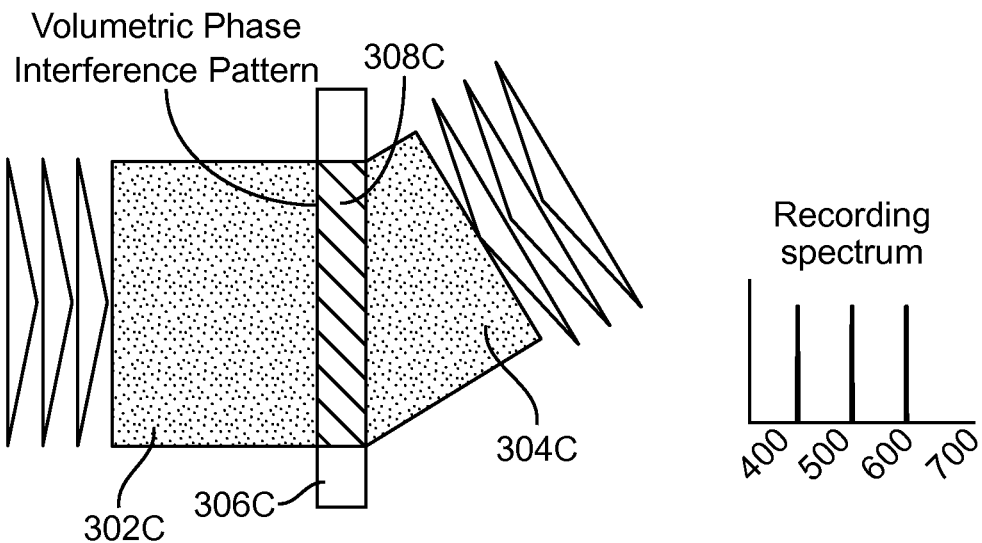
FIGS. 3C-D illustrate some schematic representations of making and using volumetric phase diffractive elements for RGB (Red, Green, and Blue) in some embodiments.
Figure 3D:
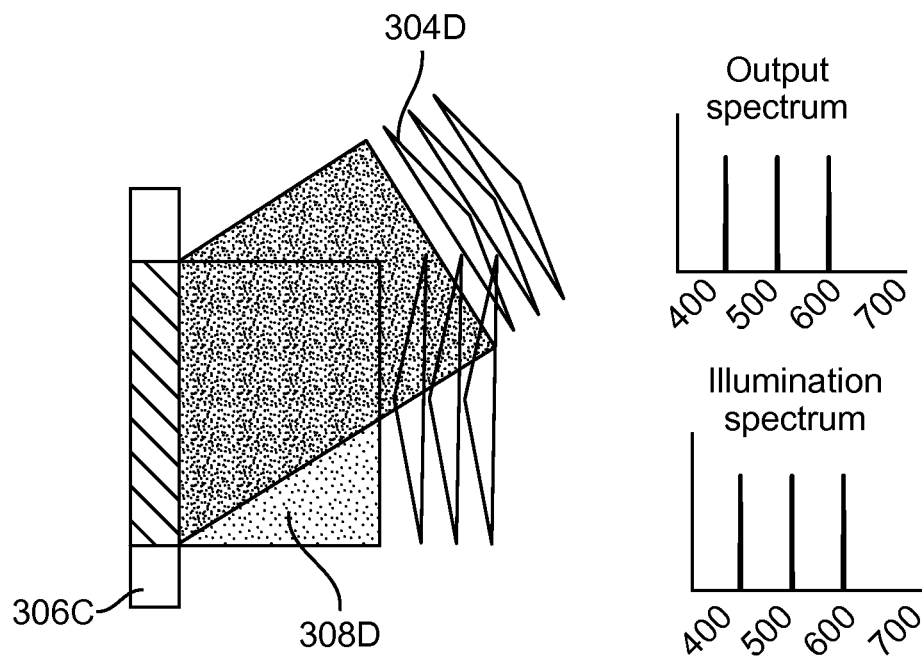

FIGS. 3C-D illustrate some schematic representation of making and using volumetric phase type diffractive elements for RGB (Red, Green, and Blue) in some embodiments. More specifically, FIG. 3C illustrates the use of three recording light beams (e.g., a red laser beam, a blue laser beam, and a green laser beam) for recording the volumetric phase interference pattern in photopolymer films. Each of the three recording beams 302C records a separate superimposed diffractive elements 308A within the photopolymer film 306C in an identical or substantially similar manner as that described for monochromatic recording light beam in FIGS. 2A-B and 3A.

FIG. 3D illustrates a use case when narrow-band or laser-source RGB illumination light 308D is directed toward a fabricated RGB diffractive elements 306C. When the RGB laser light beam is directed toward the RGB diffractive elements, each color is diffracted or reflected by its respective diffractive elements. Each laser color of the RGB laser illumination light 308D is reflected or diffracted when the RGB light passes through its own diffractive elements in the RGB diffractive elements 306C due to the wavelength selective nature of the RGB diffractive elements 306D. Therefore, the exiting light beam for an incident light beam component (e.g., red, blue, or green) appears approximately the same color as the corresponding light component of the incident RGB light beam that is used to record the diffractive elements. As a result, the exiting light beam 304D also appears approximately full color.

The line plot corresponding to FIG. 3C illustrates the wavelengths of the recording spectrum of the recording beams having three peaks that respectively represent the red, green, and blue light components of the recording light beam. The line plots corresponding to FIG. 3D illustrate the output spectrum of the exiting light beam 304D as well as the illumination spectrum of the broad-band light source 308D. The deviation between the recording RGB recording beams (302C and 304C) and the reconstruction (e.g., 308D) may cause angular displacement of the diffracted light beam, and significant amount of deviation of wavelength may result in decreased diffraction efficiency due to Bragg condition mismatch.

Figure 3E:
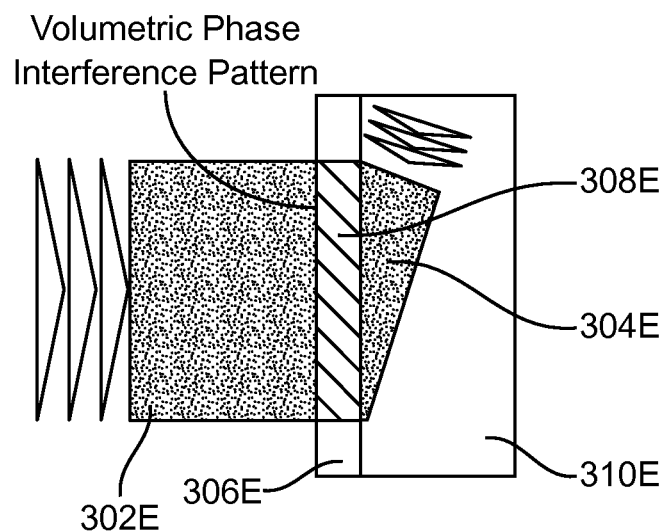
FIGS. 3E-F illustrate some schematic representations of making and using steep-angle volumetric phase diffractive elements for RGB (Red, Green, and Blue) in some embodiments.
Figure 3F:
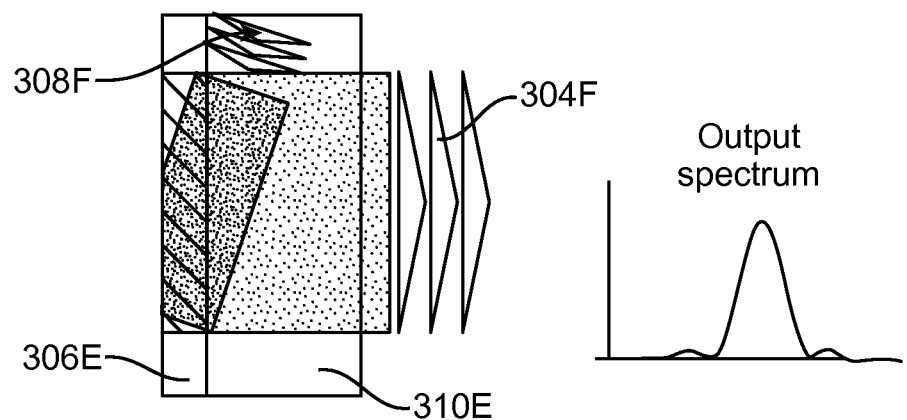

FIGS. 3E-F illustrate some schematic representation of making and using steep-angle volumetric phase type diffractive elements for RGB (Red, Green, and Blue) in some embodiments. More specifically, FIG. 3E illustrates the use of two recording beams 302E and 304E to record the volumetric phase interference pattern in photopolymer films or polymer-dispersed liquid crystal materials. The two recording beams 302E and 304E interfere to produce diffractive elements 308E within the photopolymer film 306E in an identical or substantially similar manner as that described for monochromatic recording light beam in FIGS. 2A-B.

In FIG. 3E, the second recording beam 304E is directed at a relative steep angle to the photopolymer film 306E. In some embodiments, a waveguide made of relative high refractive index host medium 310E (e.g., glass, transparent or translucent plastic, etc.) coupled with a diffractive optical element (DOE) may be used to control or improve the steep angle incident recording light beam 304E. FIG. 3F illustrates broad-band light (e.g., white illumination light) directed toward the diffractive elements from the direction (the same direction of the second recording beam 304E in FIG. 3E) of one of the recording beams, some of the broad-band light may be diffracted and deflected in the same direction as the first recording light beam 302E due to the steep angle of the second recording light beam 304E in the fabrication process of the volumetric phase interference pattern. Because of the refractive index of and the interference pattern structures in the photopolymer film 306E, only light beams 308F of a relatively narrow band of color may be diffracted. Therefore, the exiting light beam 304F appears approximately the same color as the recording light beam (302E and 304E) that is used to record the diffractive elements. The line plot corresponding to FIG. 3F illustrates the output spectrum of the exiting light beam 304F.

In some embodiments, the volumetric phase steep angle diffractive elements for the EPEs and OPEs may be made by using, for example Nd: YAG (neodymium-doped yttrium aluminum garnet or $Nd:Y_3Al_5O_{12}$) or the Nd:YLF (Neodymium-doped yttrium lithium fluoride or $Nd:LiYF_4$) as the lasing medium for solid-state lasers for recording the interference patterns in photopolymer films including Bayer Bayol® HX self-developing photopolymer film. The recording dosage may range from a few millijoules per square centimeter ($mJ/cm^2$) to tens of millijoules per square centimeter with varying recording times.

For example, the volumetric phase interference patterns may be fabricated with 10 mJ/cm2 for a period of 10 seconds or shorter to fabricate the EPEs or OPEs in some embodiments. The laser beam distribution may be offset from the center to produce an intensity ramp on the diffractive element recoding plane to produce a variation in the diffraction efficiency in some embodiments. The variation in diffraction efficiency may result in a more uniform distribution of diffracted beams from the TIR-illuminated construct (total internal reflection-illuminated construct). Some illustrative setups for recording volumetric phase type diffractive elements or volumetric phase steep angle diffractive elements by using one or more lens-pinhole spatial filters (LPSF), collimators (COLL), and various other optic elements to fabricate EPEs and/or OPEs are shown in FIGS. 4A-C.

Figure 4C:
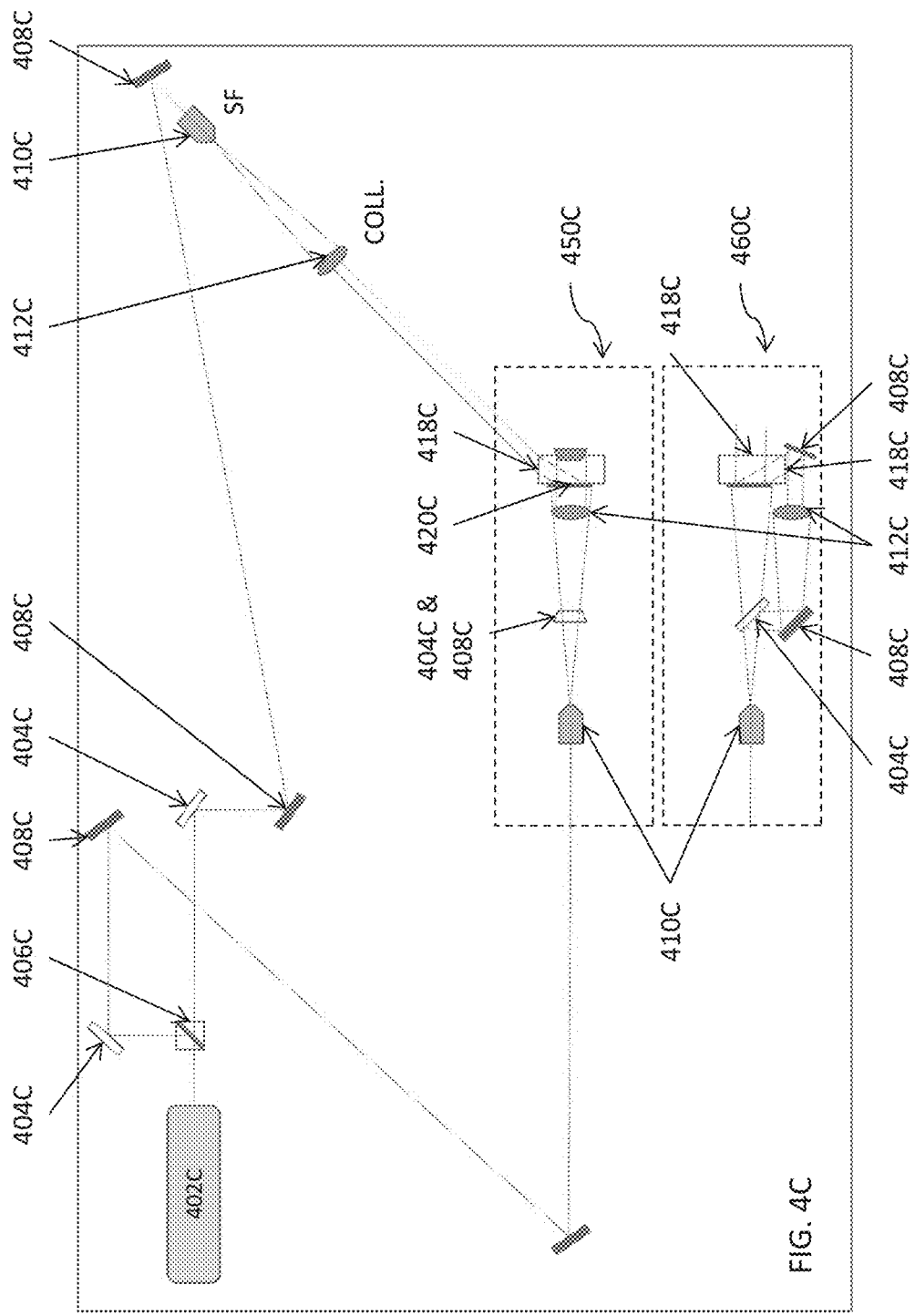

FIGS. 4A-C illustrate some schematic setups for recording volumetric phase type diffractive elements or volumetric phase steep angle diffractive elements to fabricate EPEs, OPEs and/or combined EPE/OPEs in some embodiments. More specifically, FIG. 4A shows an illustrative recording system design that uses the neodymium-doped yttrium aluminum garnet (Nd: YAG) lasing medium for solid-state laser to record volumetric-phase type diffractive elements for EPEs, OPEs, and/or combination EPEs and OPEs. The solid-state Nd: YAG lasers 400A emit light at, for example, 532 nm, and the laser light travels through a series of optic elements including the variable beam splitter 412A, beamsplitters, beam combiners, or transparent blocks 406A, various mirrors 404A, spatial filters 414A, collimators 408A, and lens and eventually perform the recording function to fabricate the desired or required diffractive elements on a film material positioned on the DOE (diffractive optic element) plane 402A.

In these embodiments illustrated in FIG. 4A, a prism 418A is used to couple the laser light into one side of the substrate carrying the film. It shall be noted that although the distance from the focal point 416A of the optic element 410A to the DOE recording plane 402A in this illustrated embodiment is 1-meter, this distance may be varied to accommodate different design configurations for different recording systems and thus shall not be considered or interpreted as limiting the scope of other embodiments or the scope of the claims, unless otherwise specifically recited or claimed.

FIG. 4B shows another illustrative recording system design in some embodiments. In addition to the Nd:YAG laser 454B generating green-colored laser light beams 408B, the illustrative recording system in FIG. 4B uses two additional solid-state laser 452B (Neodymium-doped yttrium lithium fluoride or Nd:YLF) generating blue-colored laser light beams 410B and 456B (Krypton Ion laser) generating red-colored laser light beams 406B to record volumetric-phase type diffractive elements for EPEs, OPEs, and/or combination EPEs and OPEs. The red, green, and blue colored light beams are combined with a series of optic elements (e.g., beam-splitter, beam-combiner, or transparent block 412B, wavelength-selective beam combining mirrors 414B, variable beam-splitters 416B) to form RGB (red, green, and blue) light beams 404B that are further transmitted through a plurality of optic elements (e.g., spatial filters 418B, collimators 420B, focusing lens 422B, and prism 424B) to fabricate the desired or required diffractive elements on a film located on the DOE (diffractive optical element) recording plane 402B.

Similar to the recording system illustrated in FIG. 4A, the recording system illustrated in FIG. 4B includes the prism 424B to couple light beams into the film on the DOE recording plane 402B. Also similar to the recording system illustrated in FIG. 4A, although the distance from the focal point 426B of the optic element 422B to the DOE recording plane 402B in this illustrated embodiment is 1-meter, this distance may be varied to accommodate different design configurations for different recording systems and thus shall not be considered or interpreted as limiting the scope of other embodiments or the scope of the claims, unless otherwise specifically recited or claimed. In one embodiment, the internal angle may be 73-degree from the normal direction of the prism 418A or 424B although different angles may also be used for different but similar configurations.

FIG. 4C shows another illustrative recording system design in some embodiments. For the ease of illustration and explanation , the illustrative record system in FIG. 4C includes for example, the Nd:YAG laser 402C (or other lasing medium or media for different or additional light beams) to generate light beams for recording diffractive elements on a film located on the DOE recording plane 420C. The laser light beams are transmitted through a plurality of optic elements including, for example, beam-splitter, beam-combiner, or transparent block 404C, wavelength-selective beam combining mirrors 408C, variable beam-splitters 406C, spatial filters 410C, collimators 412C, beam-splitter 404C, and periscope 408C and are eventually coupled into the film or substrate located on a glass block 418C to record the diffractive elements on the film or substrate.

FIG. 4C also shows the top view 450C and the side view 460C of a part of the recording system. In this illustrative recording system in FIG. 4C, the light beams used for recording diffractive elements are coupled into the substrate or film by using a glass block 418C, rather than a prism as shown in FIGS. 4A-B. The use of a glass block (e.g., 418C) allows access from four sides of the glass block for the light beams rather than two sides from the prism as shown in FIGS. 4A-B. In one embodiment, the internal angle may be 30-degree from the normal direction of the glass block 418C although different angles may also be used for different but similar configurations. In addition or in the alternative, the distance between the spatial filter 410C and the DOE recording plane 420C is 0.5 meter, although it shall be noted that this distance may be varied to accommodate different design configurations for different recording systems and thus shall not be considered or interpreted as limiting the scope of other embodiments or the scope of the claims, unless otherwise specifically recited or claimed.

Figure 5A:
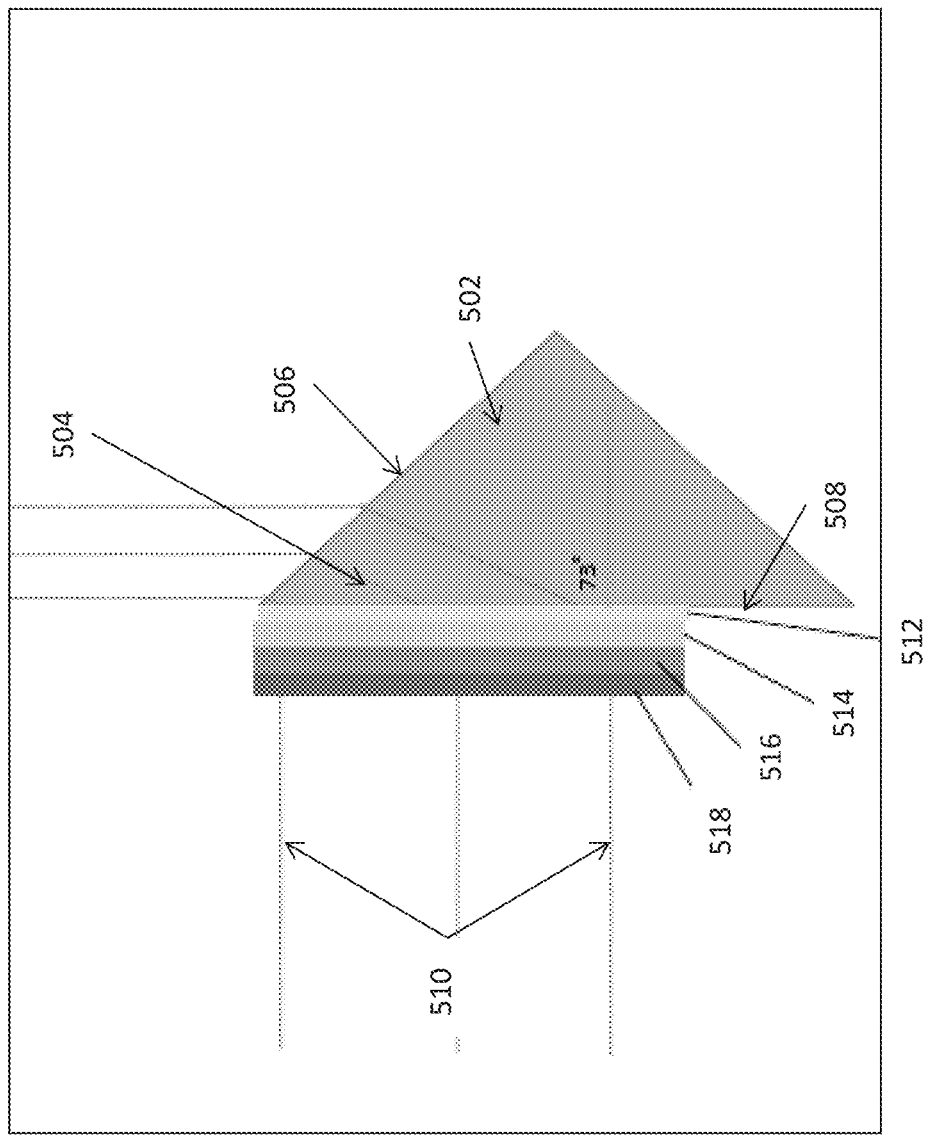
FIG. 5A shows a schematic representation of one embodiment of an exit pupil expander recording stack of material and component layers and one of many possible recording geometries.

FIG. 5A shows a schematic representation of the recording configuration for one embodiment of EPE diffractive elements. Expanded laser beams 510 and reference laser 504 intersect at a steep angle (shown as 73° here, but arbitrarily adjustable) within the recording material 514 through index-matching coupling prism 502 and index-matching coupling fluid 512, a substrate 514, a photopolymer layer 516, and a dielectric layer 518, all of which have nominally high (~1.51) or similar index of refraction. Use of index-matching elements enables coupling of light into the recording material that would otherwise be highly-reflected from the surface of the material and not coupled in contribute to diffractive element recording.

Figure 5B:
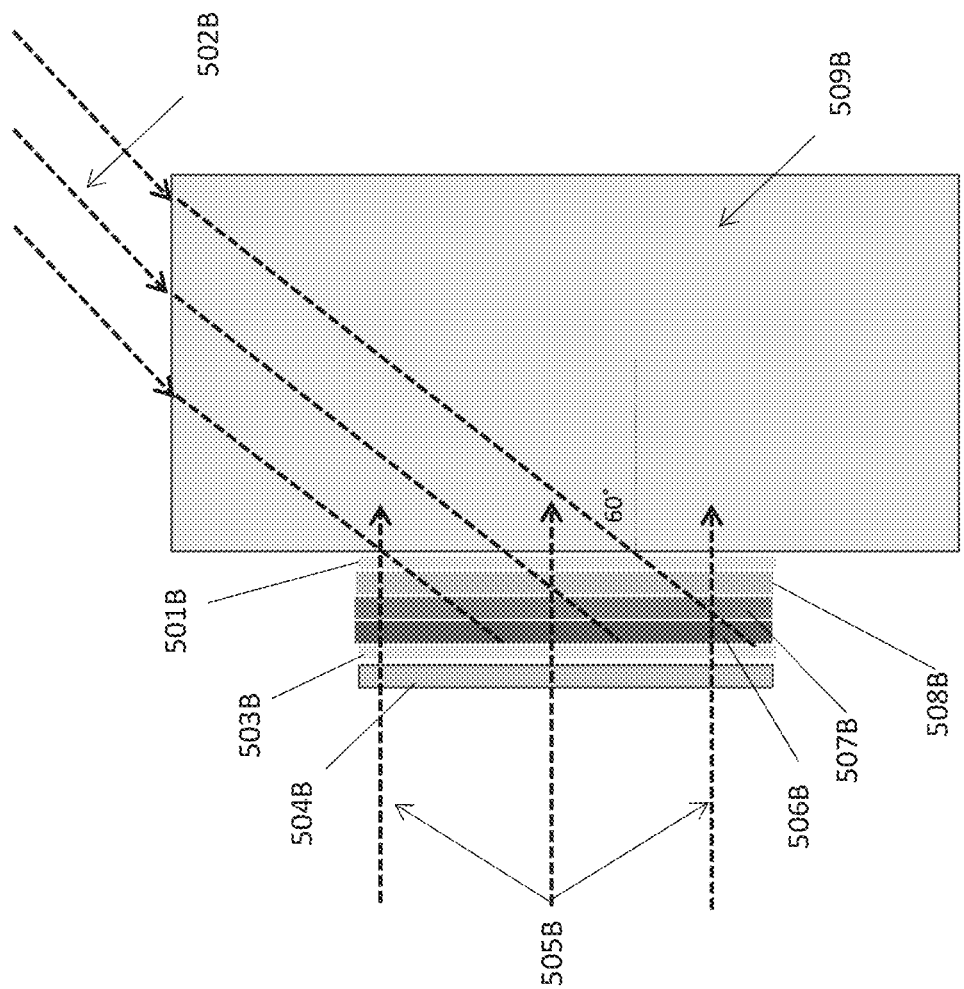
FIG. 5B shows a schematic representation of one embodiment of an exit pupil expander, orthogonal pupil expander, input coupling diffractive elements, or combination diffractive element recording stack of material and component layers and one of many possible recording geometries.

FIG. 5B shows a schematic representation of an alternative recording configuration for various embodiments of EPE, OPE or ICO diffractive elements. Expanded laser beams 502B and 505B intersect at a steep angle (shown as 60° here, but arbitrarily adjustable) within the recording material 507B through index-matching block 509B and index-matching coupling fluid 501 B and substrate 508B, all of nominally high and matched indices of refraction (~1.46), but lower than the index of refraction of recording material 507B. Anti-reflection coated and or also absorbing layer 504B, nominally glass or plastic, is coupled to the recording stack with index-matching fluid layer 503B. Layer 504B and its associated anti-reflection coatings prevent total-internal reflection (TIR) of beam 502B, to mitigate recording of secondary diffractive elements from that reflected light.

The illustrative EPE diffractive element recording stack in FIG. 5A is disposed on one side of a rectangular side 508 of the triangular prism. It shall be noted that in FIG. 5A, the EPE diffractive element recording stack appears to be disposed on a rectangular side 508 for the ease of illustration and explanation purposes. The EPE may be disposed in a variety of different manners as will be described in subsequent paragraphs with reference to FIGS. 7-15. The EPE diffractive element recording stack comprises a film 512 of xylenes (n~1.495) or mineral oil (n~1.46), a film 514 of mic. slide (n~1.51) stacked on the xylenes or mineral oil film, a film 516 of Bayer Bayfol HX photopolymer film (n~1.504) stacked on the mic. slide film, and a film 518 of polycarbonate (n~1.58). In FIG. 5B, an EPE or OPE diffractive element recording stack comprises a film 508B of Cargille 1.46 index matching oil (n~1.46), a film 508B of quartz or fused silica microscope slide stacked on the index matching oil film, a film 507B of Bayer Bayfol HX photopolymer film (n~1.504) stack on the microscope slide film, and a film 506B of polyamide (n 1.52). Further, a film of Cargille 1.52 index matching oil (n~1.52) is stacked on to film 506B, and a film of anti-reflection-coated and/or absorbing gray glass 504B is stacked onto the index-matching oil.

In contrast, when the reference beam 504 in FIG. 5A is directed toward a rectangular side 506 of the triangular prism 502, the refractive index of the triangular prism causes the beam to deflect toward the EPE diffractive element recording stack which may be configured as shown to deflect the reference beam 504 such that the normal beam 510 interferes with it, and produces diffractive elements which are recorded in 516. When the reference beam 502B in FIG. 5B is directed toward a rectangular side of the block 509B, the refractive index of the block causes the beam to deflect toward the EPE/OPE diffractive element recording stack which may be configured as shown to deflect the reference beam 502B such that the beam 505B interferes with it and produces diffractive elements which are recorded in 507B.

In some embodiments, the diffractive optical element (DOE) may be sandwiched in, coupled with, or otherwise integrated with a waveguide and may have relative low diffraction efficiency so only a smaller portion of the light, rather than the light in its entirety, is deflected toward the eyes while the rest propagates through the planar waveguide via, for example, total internal reflection (TIR). It shall be noted that the light propagates within a waveguide, and diffraction occurs when the light encounters the diffractive optical element (DOE) coupled with the DOE due to the interference of light waves in some embodiments. Therefore, one of ordinary skill in the art will certain appreciate the fact that the diffractive optical element constitutes the "obstacle" or "slit" to cause diffraction, and that the waveguide is the structure or medium that guides the light waves.

Figure 6:
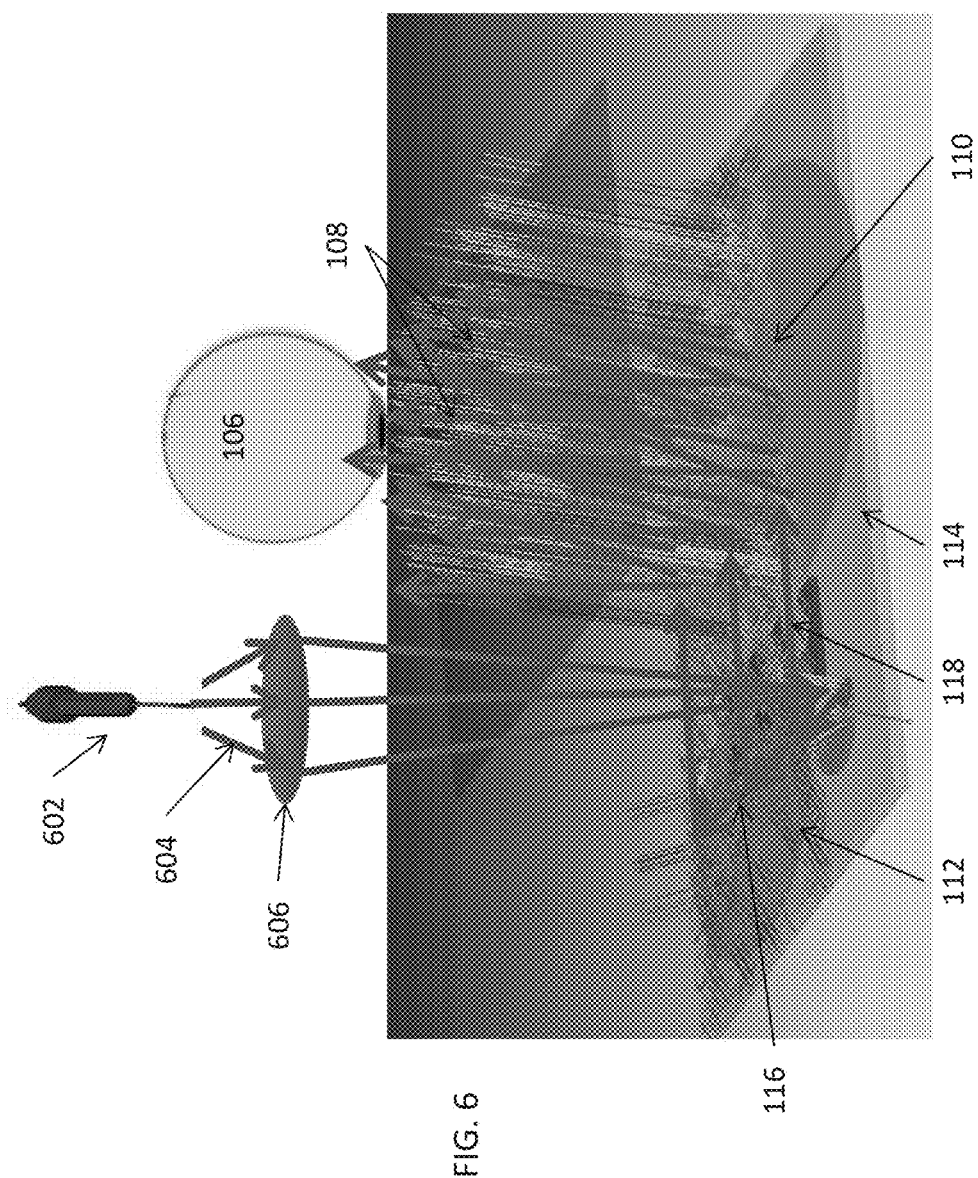
FIG. 6 shows an illustrative configuration of one embodiment of the ICO, EPE, and OPE components in a single wafer substrate, and their functions when illuminated with an image projection system.

FIG. 6 shows an illustrative configuration of an apparatus for virtual and/or augmented reality applications in some embodiments. More specifically, FIG. 6 illustrates a co-planar OPE/EPE configuration for a virtual or augmented reality device. In these embodiments illustrated in FIG. 6, the OPE 112 and EPE 110 are arranged in a substantially co-planar manner on a, for example, glass or transparent or translucent plastic substrate 114 which also serves as a waveguide to guide the light waves propagating therewithin. During operation of the illustrative apparatus, the input light beam 604 may be transmitted from a source 602 which may include one of a fiber scanning system, a fiber scanner, a pico-projector, a bundle of projectors, micro-array displays, LCoS or Liquid Crystal on Silicon, or DLP or Digital Light Processing, or any other sources that may be used to provide input light beams.

The input light beams from the source 602 is transmitted to scanning optics and/or an in-coupling optics (ICO) 606 and directed toward to the OPE diffractive elements 112 that are disposed or integrated on the substrate 114. The OPE diffractive elements 112 cause the light beams to continue to propagate along the array of OPE diffractive elements 112 within a waveguide 114 as shown by the arrowheads 116. Every time when the light beams hit the slanted OPE diffractive elements 112, a portion of the light beams is thus deflected by the OPE diffractive elements 112 toward the EPE diffractive elements 110 as shown by the arrowheads 118. When the portion of the light beams that are deflected to the EPE diffractive elements 110 hits the EPE diffractive elements, the EPE diffractive elements 110 deflect the incoming light beams into exiting light beams 108 toward the user's eye(s) 106.

Figure 7:
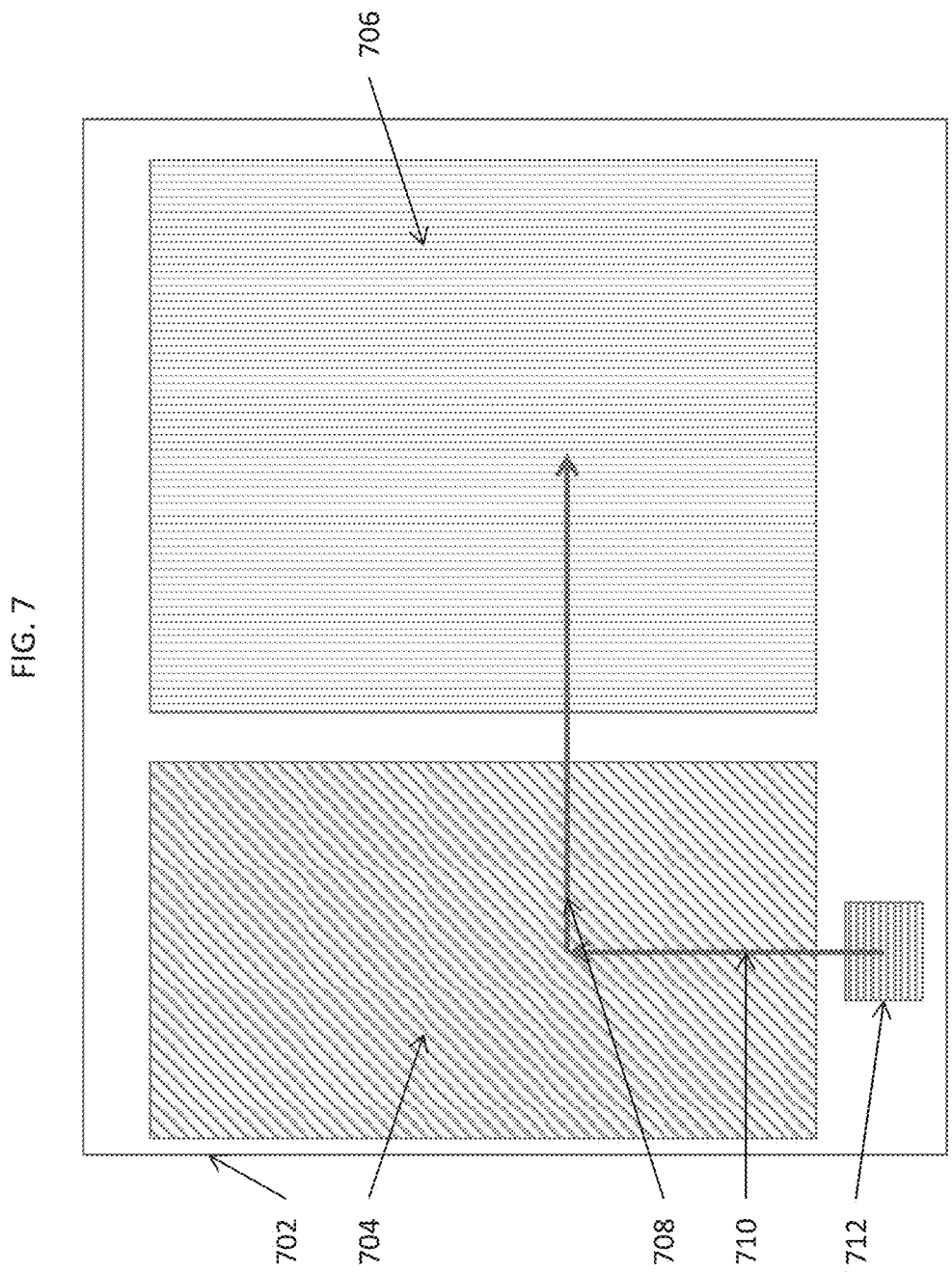
FIG. 7 illustrates a schematic arrangement of a co-planar OPE and EPE arrangement operatively coupled to an in-coupling optic device in some embodiments.

FIG. 7 illustrates a schematic arrangement of a co-planar OPE and EPE arrangement operatively coupled to an in-coupling optic device in some embodiments. The OPE and EPE diffractive elements may be arranged in a substantially co-planar manner on a substrate 702 such as a glass or transparent or translucent plastic substrate. In some of these embodiments, the OPE diffractive elements 704 and/or the EPE diffractive elements 706 may comprise the surface-relief type diffractive elements that may be produced optically with, for example, laser beam interference or be produced digitally with, for example, computer-designed structures and microscopic fringe-writing techniques.

Diffractive elements produced in this manner may be replicated through embossing or casting and usually exhibit dispersive behavior like a prism. In some other embodiments, the OPE diffractive elements 704 and/or the EPE diffractive elements 706 may comprise the volumetric-phase type diffractive elements that may be produced and replicated optically through, for example, contact copying. The volumetric-phase type diffractive elements may be produced in lamintable photopolymer films (e.g., Bayer Bafol HX) or in polymer-dispersed liquid crystal layers (PDLC layers) in some embodiments. The volumetric-phase type diffractive elements may be wavelength selective and behavior like a dichroic mirror. In some other embodiments, at least a first portion of the OPE diffractive elements or the EPE diffractive elements may be of the surface-relief type diffractive elements, and at least another portion of the OPE diffractive elements or the EPE diffractive elements may be of the volumetric-phase type diffractive elements.

During operation, the in-coupling optics 712 receives input light beams from, for example, a fiber scanner or a pico-projector (not shown in FIG. 7) and refracts the input light beams toward the OPE diffractive elements 704 as shown by the input light beams 710. The OPE diffractive elements 704 may be configured in a slanted orientation to deflect some of the input light beams toward the EPE diffractive elements 706 as shown by the light beams 708. In addition or in the alternative, the OPE diffractive elements 704 may be configured or devised to have relative low diffraction efficiency such that a desired portion of the input light beams 710 continues to propagate within the substrate 702 via, for example, total internal reflection (TIR), and that the remaining portion of the input light beam from the ICO 712 is deflected toward the EPE diffractive elements 706.

That is, every time the input light beam hits the OPE diffractive elements, a portion of it will be deflected toward the EPE diffractive elements 706 while the remaining portion will continue to transmit within the substrate, which also functions as a waveguide to guide the light waves propagating therewithin. The diffraction efficiency of the OPE diffractive elements 704 and/or that of the EPE diffractive elements 706 may be configured or devised based at least in part upon one or more criteria including the brightness or uniformity of the exiting light beams from the EPE diffractive elements 706. The EPE diffractive elements 706 receives the light beams 708 deflected from the OPE diffractive elements 704 and further deflect the light beams 708 toward the user's eye.

FIG. 8 illustrates a schematic arrangement of an overlaid or folded OPE and EPE arrangement operatively coupled to an in-coupling optic device in some embodiments. In these embodiments, the OPE diffractive elements 804 and the EPE diffractive elements 806 may be disposed or mounted on both sides of a substrate 802 (e.g., a glass or transparent or translucent plastic substrate) that also functions as a waveguide to guide the light waves propagating therewithin. The OPE diffractive elements 804 and the EPE diffractive elements 806 may be separated fabricated as two film structures (e.g., on a photopolymer film or a polymer-dispersed liquid crystal layer) and then be integrated to the substrate 802 in some embodiments.

In some other embodiments, both the OPE diffractive elements 804 and the EPE diffractive elements 806 may be fabricated on a single film or layer and subsequently folded to be integrated with the substrate 802. During operation, the in-coupling optics 808 may receive input light beams from a source (e.g., a fiber scanner or a pico-projector) and refracts the input light beams into the side of the substrate 802. The input light beams may continue to propagate within the substrate 802 via, for example, total internal reflection (TIR) as shown by 810. When the input light beams hit the OPE diffractive elements 804, a portion of the input light beams are deflected by the OPE diffractive elements 804 toward the EPE diffractive elements 806 as shown by 812 and the remaining portion of the input light beams may continue to propagate within the substrate as shown by 810.

The remaining portion of the input light beams 810 continues to propagate in the direction within the substrate 802 and hits the EPE diffractive elements 806 disposed on the other side of the substrate 802 as shown by 816. A portion of this remaining portion of the input light beams 810 is thus deflected by the EPE diffractive elements 806 and becomes the existing light beams 814 to the user's eye(s) (not shown), and the remaining portion of the input light beams 810 further continues to propagate as light beams 818 within the substrate 802. The same also applies to the deflected input light beams 812 along the horizontal direction (as shown by FIG. 8). That is, the input light beams through the ICO 808 bounce within the substrate 802.

When a portion of the input light beams hit the OPE diffractive elements 804, this portion of the input light beams is deflected to travel in the direction orthogonal (as shown by 812) to the incident direction (as shown by 810) and continues to bounce within the substrate 802 while the remaining portion continues to travel along the original direction within the substrate 802. When the light beams hit the EPE diffractive elements 806, the EPE diffractive elements 806 deflect the light beams toward the user's eye as shown by 814. One of the advantage of this folded or overlaid OPE/EPE configuration is that the OPE and EPE do not occupy as much space as the co-planar configuration (FIG. 7) does. Another advantage of this overlaid or folded OPE/EPE configuration is that the diffraction efficiency in the transmission of light due to the more confined propagation of light beams in this overlaid or folded configuration. In some embodiments, the EPE diffractive elements intercept the incident light beams and direct them toward the user's eye(s) by deflection (as shown by 814), reflection (as shown by the reflected light beams of 820), or by both deflection and reflection.

FIG. 9 illustrates another schematic arrangement of an overlaid or folded OPE and EPE arrangement operatively coupled to an in-coupling optic device in some embodiments. More specifically, FIG. 9 illustrates a substantially similar overlaid or folded OPE/EPE configuration as that in FIG. 8. Nonetheless, the overlap between the OPE diffractive elements 904 and the EPE diffractive elements 906 is different from that in FIG. 8. In some embodiments, the degree or extent of overlap or how the OPE and EPE diffractive elements overlap may be determined based at least in part upon one or more design criteria or requirements and/or the desired or required uniformity of the exiting light beams.

FIGS. 10A-B illustrate another schematic arrangement of an overlaid or folded OPE and EPE arrangement in some embodiments. FIG. 10A shows the OPE diffractive elements 1004A and the EPE diffractive elements 1006A disposed on both sides of a substrate (e.g., a glass or transparent or translucent plastic substrate) 1002A. FIG. 10B also shows the OPE diffractive elements 1004B and the EPE diffractive elements 1006B disposed on both sides of a substrate (e.g., a glass or transparent or translucent plastic substrate) 1002B. Nonetheless, the thickness of the substrate 1002B is smaller than that of the substrate 1002A.

As a result of the thinner substrate 1002B, the density of the output light beams 1010B is higher than the density of the output light beams 1010A because the light beams 1008B travels for a shorter distance than the light beams 1010A in FIG. 10A before the light beams 1008B hit the OPE diffractive elements 1004B or the EPE diffractive elements 1006B in FIG. 10B. As FIGS. 10A-B shows, thinner substrate thickness results in higher output light beam density. The thickness of the substrate may be determined based at least in part upon one or more factors in some embodiments. The one or more factors may include, for example, the desired our required output beam density, the attenuation factor, etc. In some embodiments, the thickness of the substrate may be within the range of 0.1-2 mm.

Figure 11:
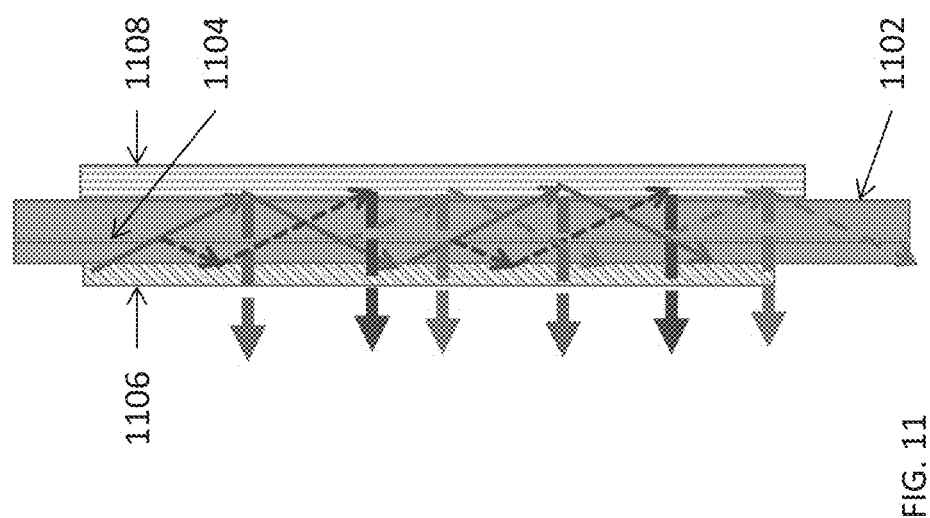
FIG. 11 illustrates another schematic arrangement of an overlaid or folded OPE and EPE and a beam multiplying layer arrangement in some embodiments.

FIG. 11 illustrates another schematic arrangement of an overlaid or folded OPE and EPE arrangement in some embodiments. More specifically, the overlaid or folded OPE and EPE arrangement illustrated in FIG. 11 includes a beam-splitting surface 1104 embedded in the substrate 1102 or sandwiched between two separate substrates 1102. As other overlaid or folded OPE/EPE configurations, the OPE diffractive elements 1106 and the EPE diffractive elements 1108 are disposed on both sides of the substrate 1102. In these embodiments, the beam-splitting surface may be embedded, sandwiched, or otherwise integrated with the substrate(s) 1102 to increase the output light beam density.

As FIG. 11 shows, the beam splitter splits a light beam into two—the reflected light beam and the transmitted light beam—as the light beam passes through the beam splitter. The beam splitter may include a thin coating on a surface of a first substrate that is subsequently glued, bonded, or otherwise attached to a second substrate. Illustrative coating may include, for example, metallic coating (e.g., silver, aluminum, etc.), dichroic optical coating, adhesives (e.g., epoxy, polyester, urethane, etc.) In some embodiments, the ratio of reflection to transmission of the beam splitter may be adjusted or determined based at least in part upon the thickness of the coating. A beam-splitter may include a plurality of small perforations to control the ratio of reflection to transmission of the beam splitter in some of these embodiments.

Figure 12A:
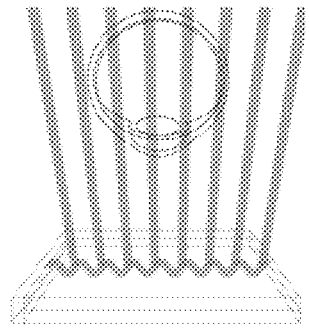
FIGS. 12A-C illustrate some schematic representations of the interactions between diffractive elements and light carrying image information for an observer in some embodiments.
Figure 12B:
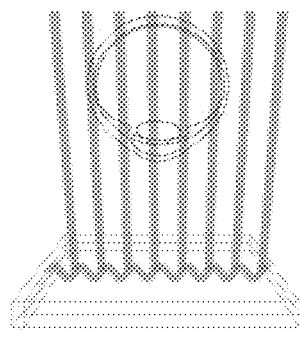
Figure 12C:
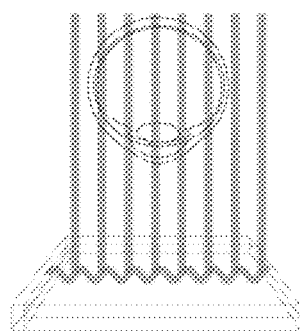
Figure 12D:
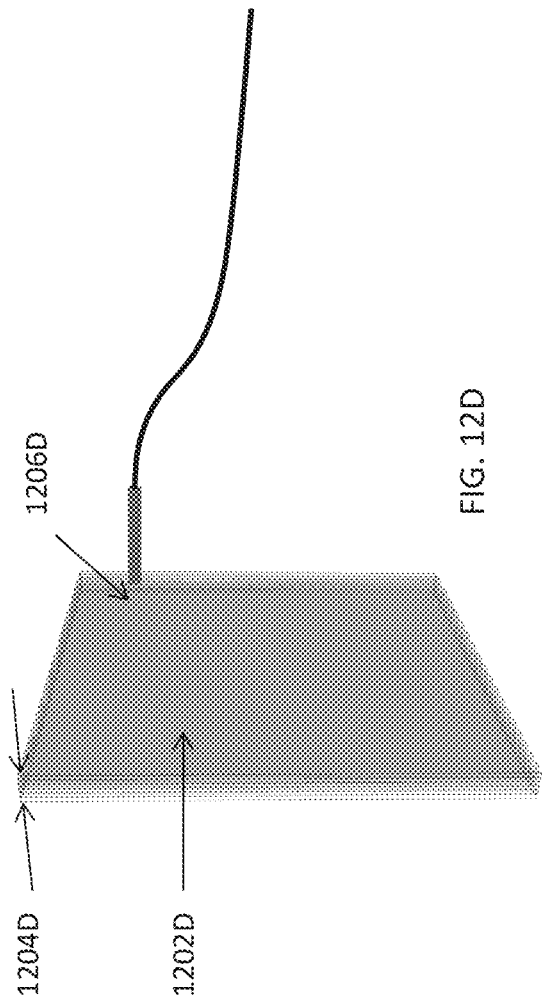
FIG. 12D illustrates a schematic representation of a multi-planar configuration for a virtual reality and/or augmented reality apparatus in some embodiments.

FIG. 12D illustrates a schematic representation of a multi-planar configuration for a virtual reality and/or augmented reality apparatus in some embodiments. In these embodiments illustrated in FIG. 12D, multiple eyepieces may be stacked on top of each other, and each eyepiece or layer of the multiple eyepieces hosts a distinct focal plane to produce images at its respective focal distance. FIGS. 12A-C illustrate some schematic representations of the interactions between diffractive elements in the multi-planar configuration illustrated in FIG. 12D and light carrying image information for an observer in some embodiments. More specifically, the multiple layers may include one layer that hosts the focal plane with the infinity focal length as shown in FIG. 12A to simulate the images as if the images are located at a substantially long distance from the user such that the light beams for forming the image are substantially parallel to each other.

FIG. 12B illustrates that the multi-planar configuration may also include a layer that hosts the focal plane with specific focal length (e.g., four meters) to produce images as if they are located four meters from the user. This may be achieved with using a combination of linear diffractive elements and radially symmetric diffractive elements as described in the preceding paragraphs with reference to FIGS. 1A-C. FIG. 12C illustrates that the multi-planar configuration may also include a layer that hosts the focal plane with a relative close in focal length (e.g., 0.5-meter) to produce images as if they are located half a meter from the user. It shall be noted that these focal lengths are provided in these figures for the ease of illustration and explanation and are not intended to limit the scope of other embodiments or the scope of the claims, unless otherwise specifically recited or claimed.

The multi-planar approach may also include layers having different or additional focal lengths. FIG. 12D illustrates a schematic representation of a six-layer multi-planar configuration for the eyepiece 1202D where the overall thickness 1204D of the six-layer eyepiece 1202D may be no more than 4 millimeters in some embodiments. One or more of these six layers may comprise a switchable layer (e.g., a PDLC or polymer-dispersed liquid crystal layer) that may be switched on and off by using control signals to change the focal planes of the produced images. This illustrative multi-planar configuration may also operatively coupled to a rapidly switching in-coupling optics (ICO) 1206D that may be further operatively coupled to a light source such as a fiber, a bundle of fibers, a multi-fiber projector, or a pico-projector, etc.

During operation, the source transmits light beams to the ICO which refracts or deflects the light beams into the plane of the eyepiece. The control signal from a controller (not shown) may further switch on a designated layer such that the diffractive elements (e.g., OPE diffractive elements and EPE diffractive elements) on the layer perform their respective functions as described above with reference to FIGS. 5-11 to produce the images at the designated focal plane as observed by the user's eye(s). Depending on where the images are intended to be observed by the user, the controller may further transmit further control signals to switch on one or more other layers and switch off the remaining layers to change the focal lengths as observed by the user's eye(s). The multi-planar configuration may provide a larger focal range by having one primary focal plane and one or more focal planes with positive margins in the focal lengths and one or more focal planes with negative margins in the focal lengths in some embodiments.

FIGS. 13A-B illustrate schematic representations of a switchable layer in some embodiments. In these embodiments, the apparatus may include the PDLC (polymer-dispersed liquid crystal) for ICO (in-coupling optics) and/or EPE switching. The apparatus includes the PDLC-filled area 1302A and the ITO (Indium tin oxide) active area 1304A that captures only one TIR (total internal reflection) bounce. The apparatus may also be operatively coupled to the ICO 1306A. FIG. 13A illustrates the produced image when the voltage is off, and FIG. 13B illustrates the produced image when the voltage is on. In some of these embodiments, the PDLC-filled area or a portion thereof may be transmissive when no voltage or current is applied.

The switchable layers in, for example, a diffractive optical element (DOE) including at least the substrate, the OPE diffractive elements, and the EPE diffractive elements may switch and thus adjust or shift focus at tens to hundreds of megahertz (MHz) so as to facilitate the focus state on a pixel-by-pixel basis in some embodiments. In some other embodiments, the DOE may switch at the kilohertz range to facilitate the focus on a line-by-line basis so the focus of each scan line may be adjusted. In some embodiments, a matrix of switchable DOE elements may be used for scanning, field of view expansion and/or the EPE. In addition or in the alternative, a DOE may be divided into multiple smaller sections, each of which may be uniquely controlled by its own ITO or other control lead material to be in an on state or an off state.

FIG. 14 illustrates a schematic representation of a multiplexed expander element in some embodiments. The multiplexed expander element 1406 combines the OPE functionality by the diagonal OPE diffractive elements 1402 and the functionality of the EPE diffractive elements 1404 in a single element on a single layer. In some embodiments, a multiplexed expander may be formed by performing an exclusive OR between the OPE diffractive element surface 1402 and the EPE diffractive element surface 1404 with the computer-designed structures and microscopic fringe-writing techniques. One of the advantages of this approach is that the resulting multiplexed element may have fewer issues with scattering and diffractive elements cross terms.

In some other embodiments, a multiplexed expander element may be formed by representing the OPE diffractive elements as a phase ramp and add the phase ramp to the lens functions in its continuous polynomial form and subsequently discretize a binary structure. One of the advantages of this second approach for fabricating multiplexed expander elements is that the high diffractive efficiency of the resulting multiplexed expander elements. In some other embodiments, a multiplexed expander element may be formed by pattern the combined patterns successively on the surface of the element, either before or after etching.

Figure 15A:
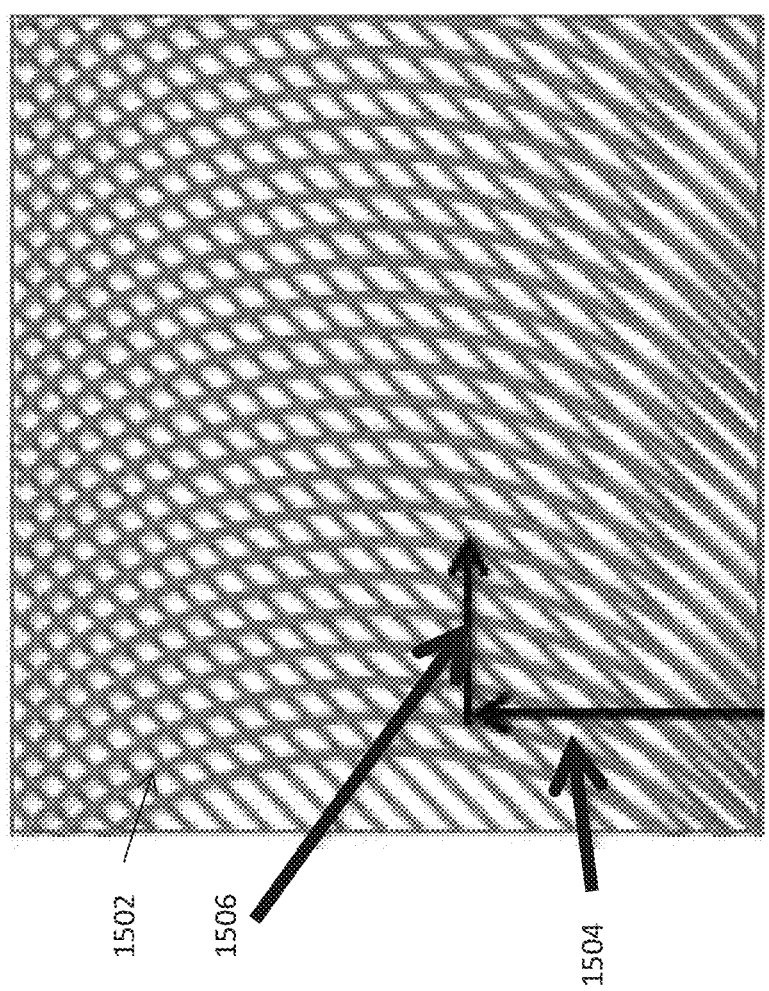
FIG. 15A illustrates a portion of a schematic representation of a multiplexed expander element in some embodiments.

FIG. 15A illustrates a portion of a schematic representation of a multiplexed expander element in some embodiments. The multiplexed expander element 1502 includes the diagonal OPE diffractive elements and the out-coupling circular EPE diffractive elements in a single element on a single layer. When an incident light beam 1504 propagates within the layer (e.g., by total internal reflection or TIR) and hits the diagonal OPE diffractive elements, the diagonal OPE diffractive elements deflects a portion of the incident light beam 1504 to form the deflected light beam 1506. A portion of the deflected light beam 1506 interacts with the out-coupling circular EPE diffractive elements and deflects a portion of the deflected light beam to the user's eye(s).

The remaining portion of the incident light beam 1504 continues to propagate within the layer and interacts with the diagonal OPE diffractive elements in a substantially similar manner to continue to deflect a portion of the propagated light beams across the multiplexed element. It shall be noted that the combined diffraction or cross terms from both the diagonal OPE diffractive elements and the out-coupling EPE circular diffractive elements will be evanescent. The deflected light beam 1506 also propagates within the layer and interacts with both the diagonal OPE diffractive elements and the out-coupling circular EPE diffractive elements in a substantially similar manner.

Figure 15B:
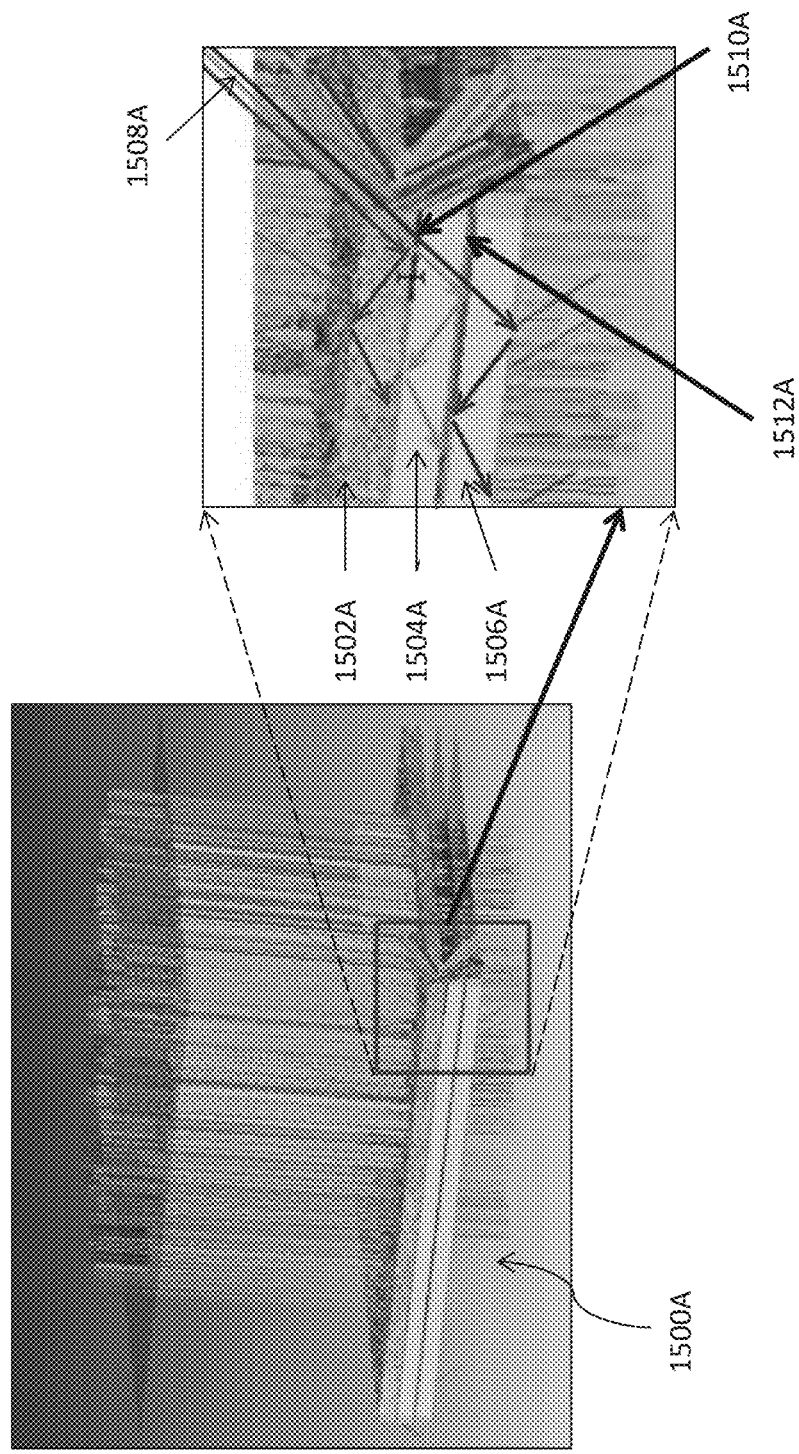
FIG. 15B illustrates another pictorial representation of a multiplexed expander assembly in some other embodiments.

FIG. 15B illustrates another pictorial representation of a multiplexed expander assembly in some other embodiments. In these embodiments illustrated in FIG. 15B, the multiplexed expander assembly 1500A includes three individual expander elements 1502A, 1504A, and 1506A that are stacked on top of each other. The incident RGB (red, green, and blue) light 1508A from the light source enters the multiplexed expander assembly 1500A via an, for example, input coupling optic element (ICO) as described above. The multiplexed expander assembly 1500A may include a first wavelength selective or wavelength specific filter (hereinafter color filter) 1510A between the individual expander element 1502A and 1504A to allow light components of certain wavelength(s) to pass through while reflecting light components of other wavelength(s). For example, the first color filter may include a blue and green pass dichroic filter such that the blue and green light components in the incident light 1508A pass through the first color filter 1510A while the red light components are reflected and henceforth propagated with the individual expander element 1502A by, for example, total internal reflection to interact with the OPE and/or the EPE diffractive elements.

The multiplexed expander assembly 1500A may include a second color filter 1512A between the individual expander element 1504A and 1506A to allow light components of certain wavelength(s) to pass through while reflecting light components of other wavelength(s). For example, the second color filter may include a blue dichroic filter such that the blue light components in the incident light 1508A pass through the second color filter 1512A while the green light components are reflected and henceforth propagated with the individual expander element 1504A by, for example, total internal reflection to interact with the OPE, EPE, and/or the focus adjustment diffractive elements (e.g., the circular or radially symmetric diffractive elements having optical powers) as shown in FIG. 15B.

The blue light components may also propagate within the individual expander element 1506A by, for example, total internal reflection to interact with the OPE, EPE, and/or the focus adjustment diffractive elements (e.g., the circular or radially symmetric diffractive elements) as shown in FIG. 15B. In some of the illustrated embodiments, the incident light 1508A is transmitted into the multiplexed expander assembly 1500A at an angle greater than the respective critical angles such that the respective light components may propagate within the respective individual expander element by total internal reflection. In some other embodiments, the multiplexed expander assembly 1500A may further include a reflective coating to cause or enhance the efficiency of total internal reflection of the blue light components in the individual expander element 1506A.

The difference between the multiplexed expander assembly 1500A and those illustrated in FIGS. 14-15, the multiplexed expander assembly 1500A includes three individual expander elements, each of which includes its own OPE, EPE, and focus adjustment diffractive elements and is responsible for the corresponding light components of specific wavelength(s). The volumetric-phase diffractive elements used in FIGS. 14-15 may be fabricated all at once with a single recording process or multiple recording processes on a single film or substrate as described above. Nonetheless, both the volumetric-phase diffractive elements as illustrated in FIGS. 14-15 and multiplexing multiple individual expander elements illustrated in FIG. 15B provide multiplexed expander elements, each of which may include the OPE, EPE, and/or the focus adjustment diffractive elements for all three primary colors in the incident input light.

Figure 16:
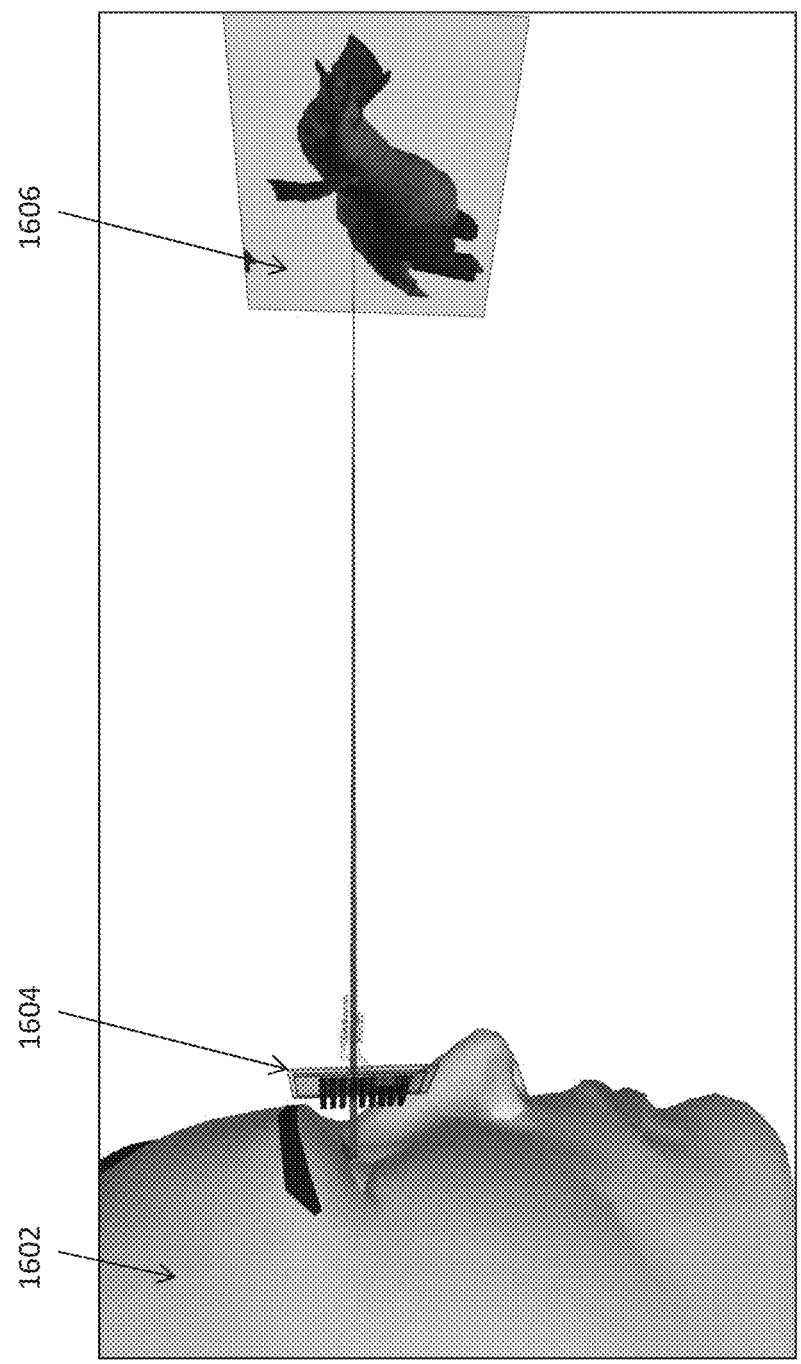
FIG. 16 shows an illustration of a user using a virtual reality or augmented reality device described herein to view an image.

FIG. 16 shows an illustration of a user 1602 using a virtual reality or augmented reality device 1604 described herein to view an image 1606. Due to the multiple, switchable focal planes provided by the virtual reality or augmented reality device, the image 1606 appear to the user that the object in the image 1606 is located at the designated focal distance(s) from the user. When the object in the image is to move further away from the user, the virtual reality or augmented reality device may switch on a designated layer having certain circular diffractive element patterns that render the object on the focal plane with a longer focal distance hosted by the designated layer.

When the object in the image is to move closer to the user, the virtual reality or augmented reality device may switch on another designated layer having certain circular diffractive element patterns that render the object on another focal plane with a shorter focal distance hosted by the designated layer. As a result of the use of different circular diffractive element patterns that change the focal points of the light beams forming the image, the object in the image may appear to the user that it is moving toward or away from the user. The virtual reality or augmented reality device 1604 may include the switchable, co-planar OPE diffractive elements and EPE diffractive elements, folded or overlaid OPE diffractive elements and EPE diffractive elements, multi-planar eyepieces, or a single-layer multiplexed OPE diffractive elements and EPE diffractive elements in different embodiments as previously described. The OPE diffractive elements and the EPE diffractive elements may include the surface relief type diffractive elements, the volumetric-phase type diffractive elements, or a combination thereof.

Moreover, the OPE diffractive elements and/or the EPE diffractive elements may include linear diffractive elements that are summed with circular or radially symmetric diffractive elements to deflect and focus exiting light beams. The linear diffractive elements and the circular or radially symmetric diffractive elements may exist on a single film or on two separate films. For example, the DOE (diffractive optical element) diffractive elements (the OPE diffractive elements and/or the EPE diffractive elements) may include a first film having linear diffractive elements and attached to a second film having circular or radially symmetric diffractive elements. In some embodiments, the virtual reality or augmented reality device may employ time-varying diffractive element control to expand the field of view as observed by the user's eye(s) and/or to compensate for chromatic aberration. Both the linear and circular DOEs may be modulated or controlled over time (e.g., on a frame sequential basis) to, for example, produce tiled display configurations or expanded field of view for the light existing toward the eyes of a user.

Figure 17:
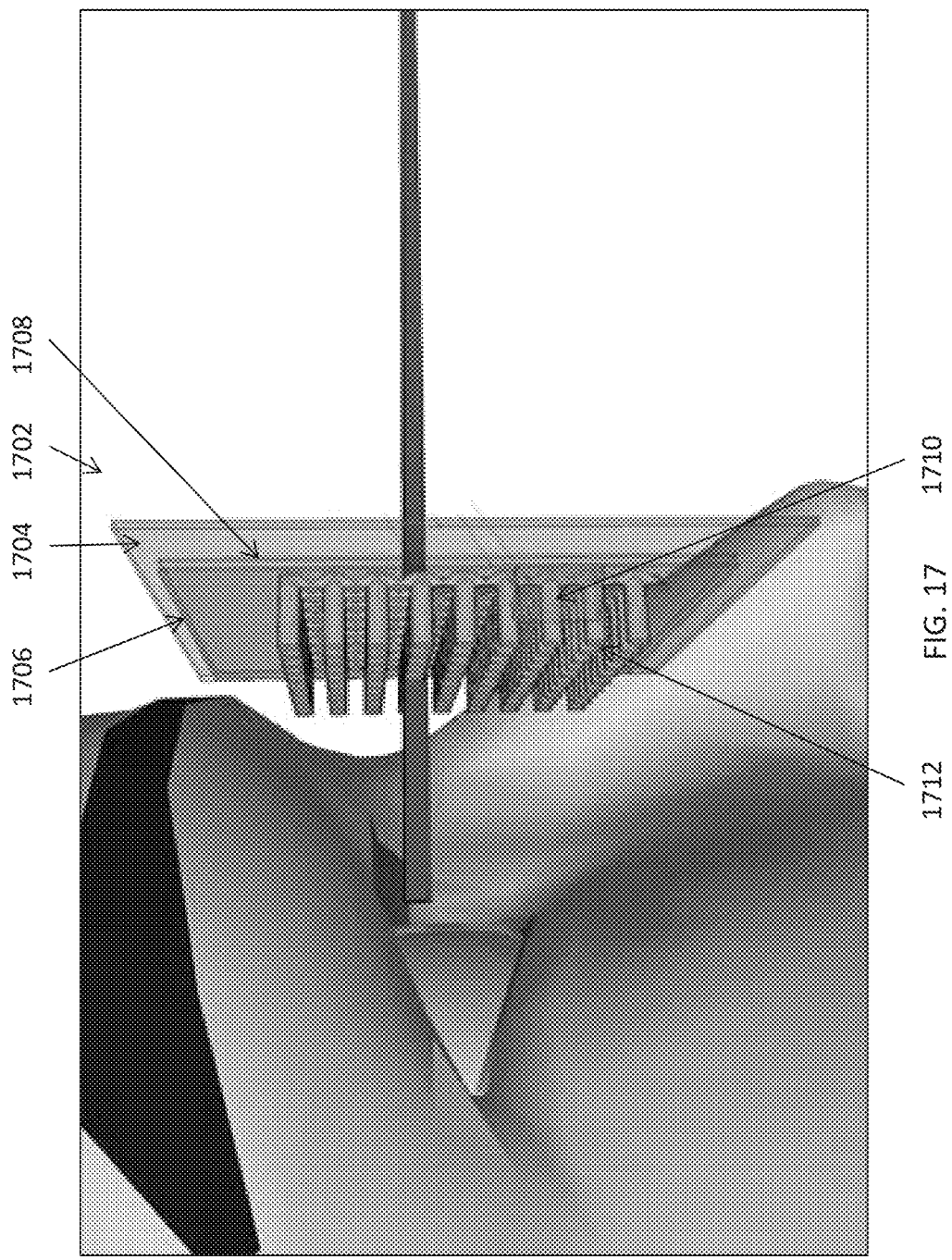
FIG. 17 illustrates a portion of FIG. 16 for illustration purposes.

FIG. 17 illustrates a portion of FIG. 16. More specifically, FIG. 17 shows the diffractive optical element 1702 including a substrate 1704 integrated with the OPE diffractive elements 1706 on the side of the substrate near the user and EPE diffractive elements 1708 on the other side of the substrate away from the user. The ICO 1710 transmits light beams into the substrate 1704, and the OPE diffractive elements and EPE diffractive elements deflect the light beams as described above into the exiting light beams 1712 observed by the user's eye(s).

Figure 18:
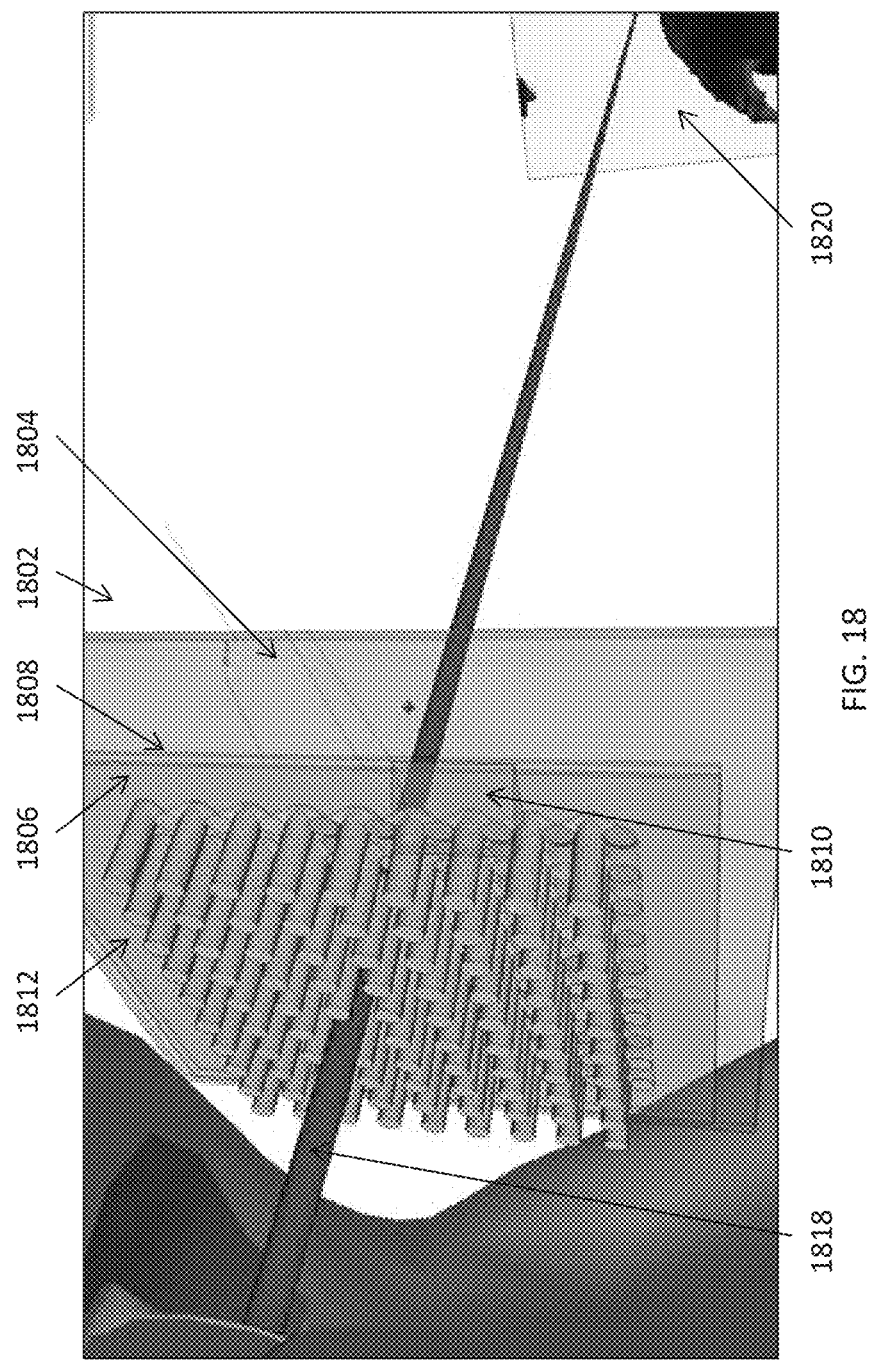
FIG. 18 illustrates another perspective of a portion of FIG. 16 for illustration purposes.

FIG. 18 illustrates another perspective of a portion of FIG. 16. More specifically, FIG. 18 shows the diffractive optical element 1802 including a substrate 1804 integrated with the OPE diffractive elements 1806 on the side of the substrate near the user and EPE diffractive elements 1808 on the other side of the substrate away from the user. The ICO 1810 transmits light beams into the substrate 1804, and the OPE diffractive elements 1806 and EPE diffractive elements 1808 deflect the light beams as described above into the exiting light beams 1812 forming an image 1820 observed by the user's eye(s). The DOE 1802 includes both linear diffractive elements and circular or radially symmetric diffractive elements to not only deflect the light beams from the ICO 1810 but also produce exiting light beams 1818 to appear as if the exiting light beams were emanating from the object being observed at the focal distance defined by the focal plane of a specific layer that hosts the focal plane.

Figure 19:
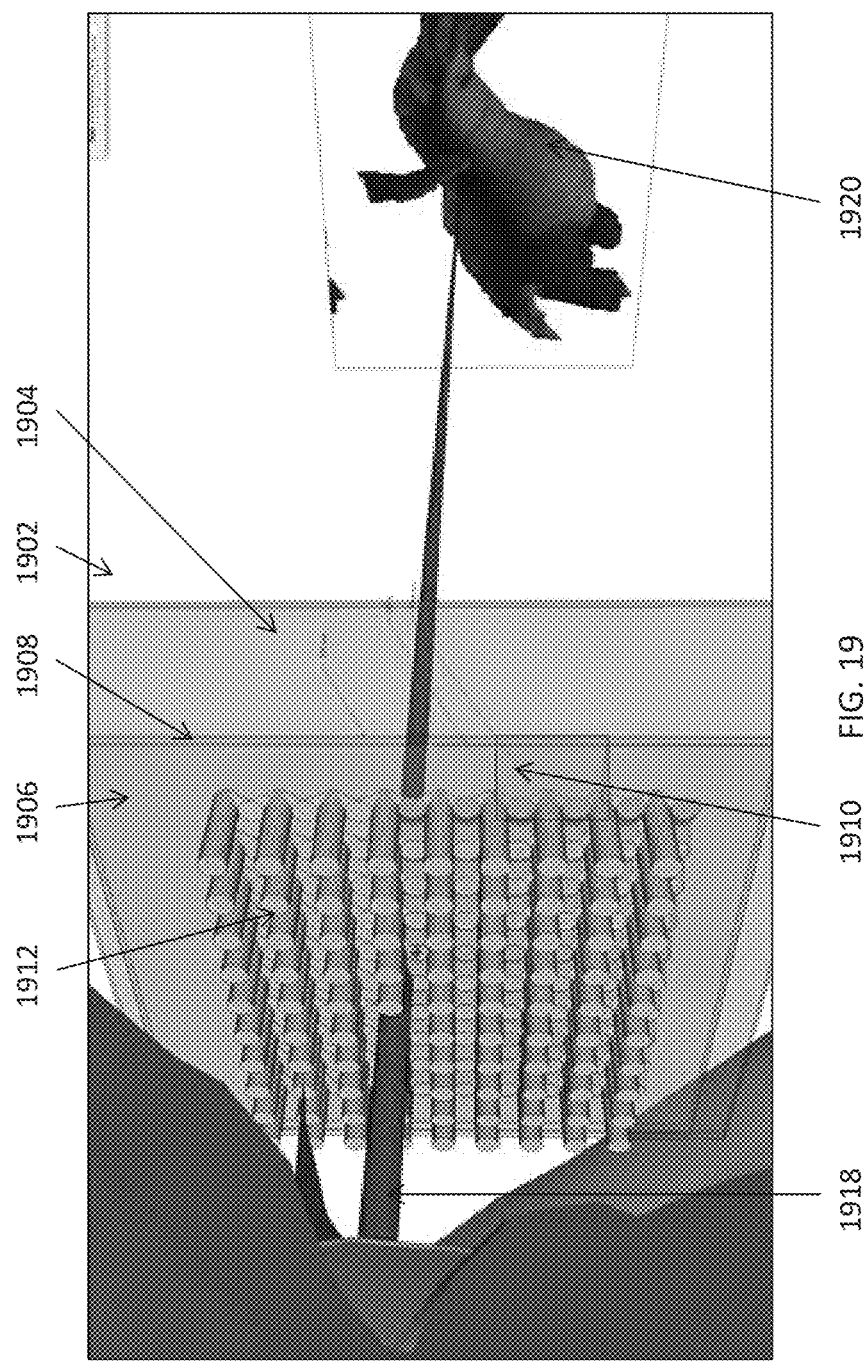
FIG. 19 illustrates another perspective of a portion of FIG. 16 for illustration purposes.

FIG. 19 illustrates another perspective of a portion of FIG. 16. More specifically, FIG. 19 shows the diffractive optical element 1902 including a substrate 1904 integrated with the OPE diffractive elements 1906 on the side of the substrate near the user and EPE diffractive elements 1908 on the other side of the substrate away from the user. The ICO 1910 transmits light beams into the substrate 1904, and the OPE diffractive elements 1906 and EPE diffractive elements 1908 deflect the light beams as described above into the exiting light beams 1912 forming an image 1920 observed by the user's eye(s). The DOE 1902 includes both linear diffractive elements and circular or radially symmetric diffractive elements to not only deflect the light beams from the ICO 1910 but also produce exiting light beams 1918 to appear as if the exiting light beams were emanating from the object being observed at the focal distance defined by the focal plane of a specific layer that hosts the focal plane.

Figure 20:
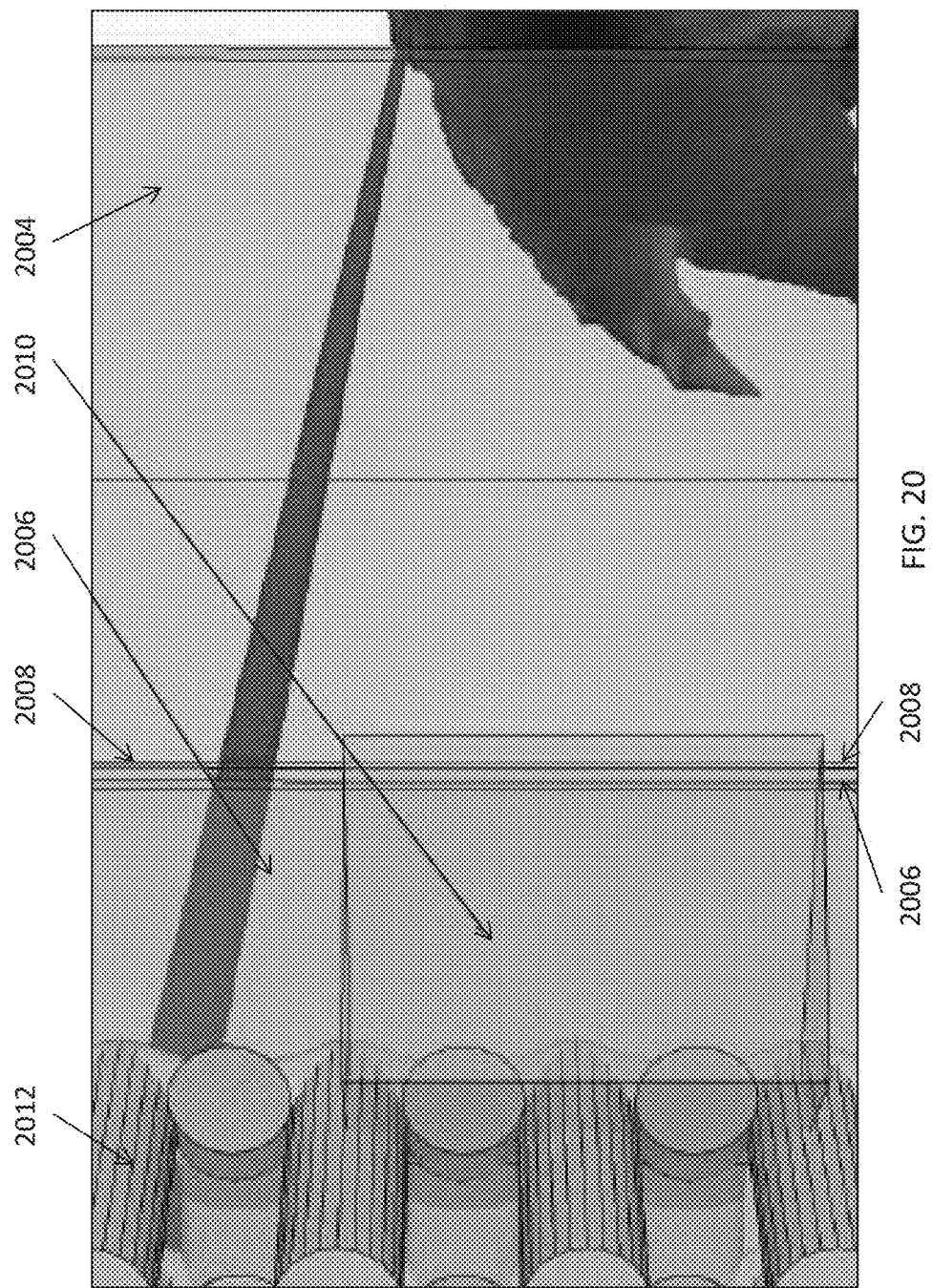
FIG. 20 illustrates a close-up view of FIG. 19 to provide a view of various elements of the diffractive optical element.

FIG. 20 illustrates a close-up view of FIG. 19 to provide a view of various elements of the diffractive optical element. More specifically, FIG. 20 shows a portion of the DOE including the substrate 2004, the OPE diffractive elements 2006 on one side of the substrate 2004 near the user, and the EPE diffractive elements 2008 on the other side of the substrate 2004. The ICO 2010 is disposed relative to the substrate to refract and transmit input light beams into the substrate. The input light beams are propagated within the substrate 2004 via total internal reflection (TIR) and interact with the OPE diffractive elements 2006 and EPE diffractive elements 2008 to deflect the input light beams into the exiting light beams 2012 observed by the user's eye(s).

Figure 21:
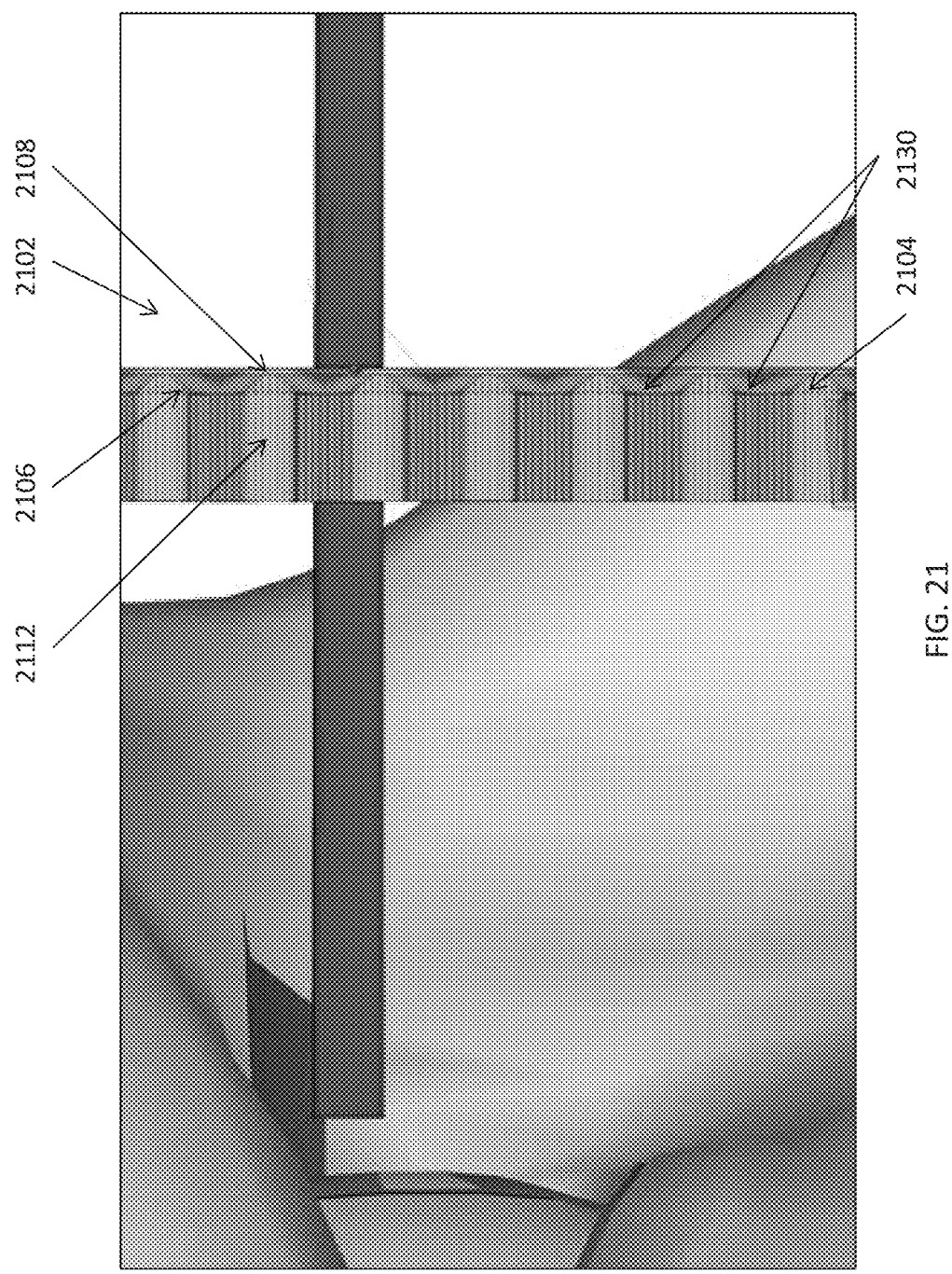
FIG. 21 illustrates a side view of an illustration of a user using a virtual reality or augmented reality device to view an image.

FIG. 21 illustrates a side view of an illustration of a user using a virtual reality or augmented reality device to view an image. The diffractive optical element 2102 includes a substrate 2104 operatively coupled to the OPE diffractive elements 2106 disposed on the near side of the substrate 2004 and the EPE diffractive elements 2108 disposed on the far side of the substrate 2104. The shapes 2112 represent the exiting light beams observable by the user's eye(s). The shapes 2130 represent the light beams bouncing between the OPE diffractive elements 2106 and the EPE diffractive elements 2108 along the vertical direction (as shown in FIG. 21) within the substrate 2104. The input light beams from, for example, the ICO element also bounce between the OPE diffractive elements 2106 and the EPE diffractive elements 2108 along the Z-direction (pointing into or out of the plane as shown in FIG. 21) in a substantially similar manner. Each time the light beams hits the OPE diffractive elements 2106, the OPE diffractive elements deflect a portion of the light beams toward the EPE diffractive elements 2108 which in turn deflects a portion of the deflected portion of the light beams toward the user's eye(s).

Figure 22:
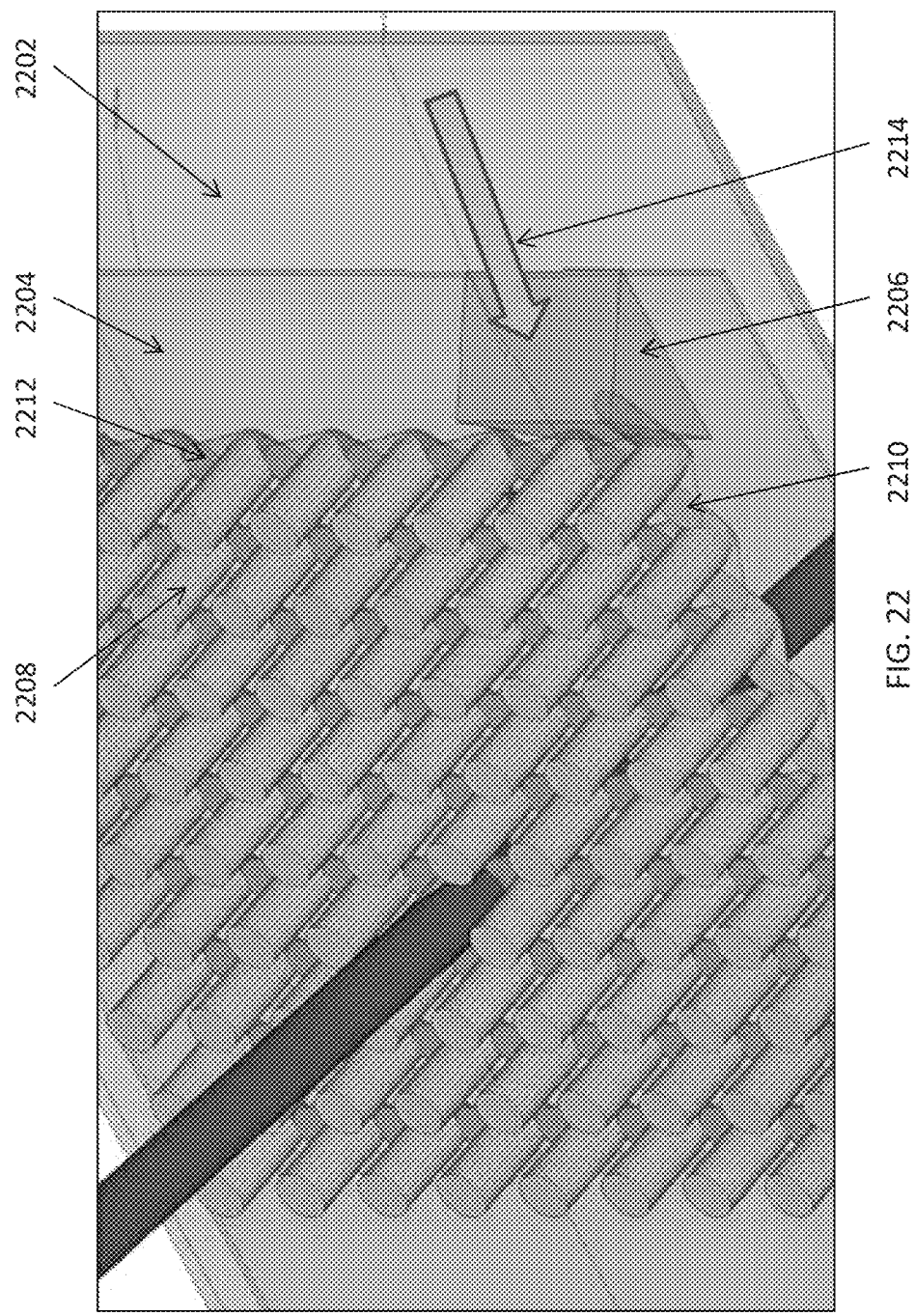
FIG. 22 illustrates a close-up view of the diffractive optical element (DOE) in some embodiments.

FIG. 22 illustrates a close-up view of the diffractive optical element (DOE) in some embodiments. The DOE includes the combination OPE/EPE diffractive elements 2204 disposed on one side of the substrate 2202. The input light beams 2214 are transmitted into the substrate via the in-coupling optics 2206 and propagate within the substrate 2202 via total internal reflection (TIR). The input light beams bounce within the substrate 2202 and interact with both the combination OPE/EPE diffractive elements 2204. More specifically, the combination of OPE/EPE diffractive elements 2204 deflects a portion of the input light beams in orthogonal directions which are substantially parallel to the surfaces of substrate 2202.

It shall be noted that although the combination OPE/EPE diffractive elements 2204 may be designed or intended to deflect light beams in orthogonal directions that are perfectly parallel to the surface of the substrate 2202, the tolerances, slacks, and/or allowances in the fabrication process(es) may nonetheless cause some deviations in the fabricated product. In addition or in the alternative, the tolerances, slacks, and/or allowances in the arrangement or relative positioning of various devices and components or the variations in the uniformity of various properties of the materials used may also cause the aforementioned orthogonal directions to deviate from being perfectly parallel to the surface of the substrate 2202. Therefore, the aforementioned "orthogonal directions" are "substantially parallel" to the surface of the substrate 2202 to accommodate such variations in the fabrication process(es), the arrangement, the relative position, and/or various variations.

The EPE diffractive elements deflect a portion of the deflected portion of the input light beams into the exiting light beams 2208 toward the user's eye(s). The shapes 2208 represent the exiting light beams observable by the user's eye(s). The shapes 2208 in FIG. 22 represent infinitely-focused image information, however any other focal distance may be produced using this approach. In some embodiments where the EPE diffractive elements include circular or radially symmetric diffractive elements in addition to linear diffractive elements, each of these shapes may have a conical form with the apex at the focal point of the circular or radially symmetric diffractive elements.

The zigzagged shapes 2210 represent a portion of the input light beams bouncing within the substrate and interacting with the combination OPE/EPE diffractive elements 2204. Each time when the portion of the light beams hits the combination OPE/EPE diffractive elements 2204, the OPE component diffractive elements deflect a portion of the light beams laterally through the substrate. Each time when the portion of deflected light beams hits the combination OPE/EPE diffractive elements 2204, the EPE component diffractive elements deflect a portion of the light beams toward the user's eye(s) and thus form the light beams 2208 observable by the user's eye(s).

The remainder of the portion of the light beams not deflected by the combination OPE/EPE diffractive elements 2204 continues to propagate within the substrate 2202 as shown by 2210. Due to the refraction index and/or the diffraction efficiency, the remaining part of the deflected portion of the light beams not deflected by the combination OPE/EPE diffractive elements continues to propagate with the substrate as indicated by the zigzagged shapes 2212. As a result, the DOE including the combination OPE/EPE diffractive elements effectively transform the input light beams into a matrix of exiting light beams forming the images perceived by the user's eye(s).

Figure 23A:
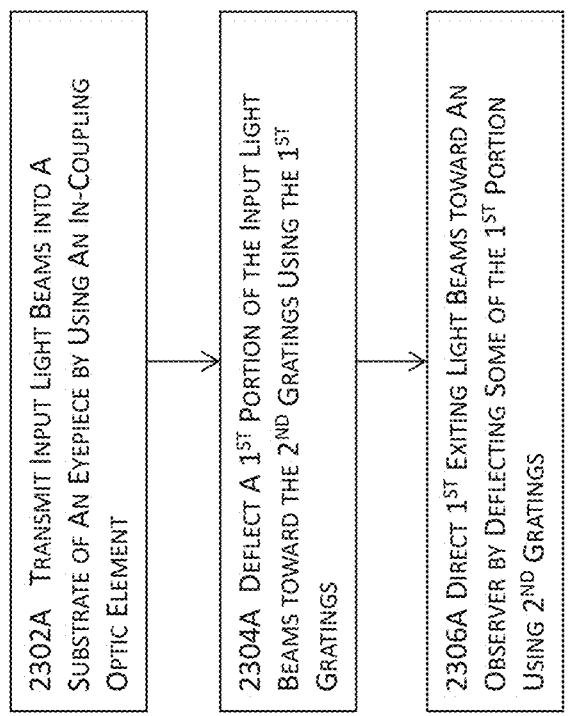
FIG. 23A illustrates a high level flow diagram for a process of generating stereoscopic images for virtual reality and/or augmented reality in some embodiments.

FIG. 23A illustrates a high level flow diagram for a process of generating stereoscopic images for virtual reality and/or augmented reality in some embodiments. Input light beams may be transmitted at 2302A into a substrate of an eyepiece for virtual reality and/or augmented reality using at least an in-coupling optical element (e.g., reference numeral 606 of FIG. 6, reference numeral 712 of FIG. 7, reference numeral 808 of FIG. 8, etc.) The substrate may comprise a translucent or transparent dielectric material.

A first portion of the input light beams may be deflected using the first diffractive elements toward the second diffractive elements at 2304A. For example, first diffractive elements may be arranged at an acute or obtuse orientation to the direction of propagation of the first portion of the input light beams coming out of the in-coupling optical element to deflect the first portion of first portion of the input light beams toward the second diffractive elements. An example of deflecting the first portion light using the first diffractive elements toward the second diffractive elements is described above with reference to FIG. 7. In some of these embodiments, the first diffractive elements comprise exit pupil expansion (EPE) structures or diffractive elements or exit pupil expanders.

At 2306A, the first exiting light beams may be directed or redirected toward an observer by deflecting at least a portion of the first portion of the input light beams using the second diffractive elements. In some of these embodiments, the second diffractive elements comprise orthogonal pupil expansion (OPE) structures or diffractive elements or orthogonal pupil expanders.

Figure 23B:
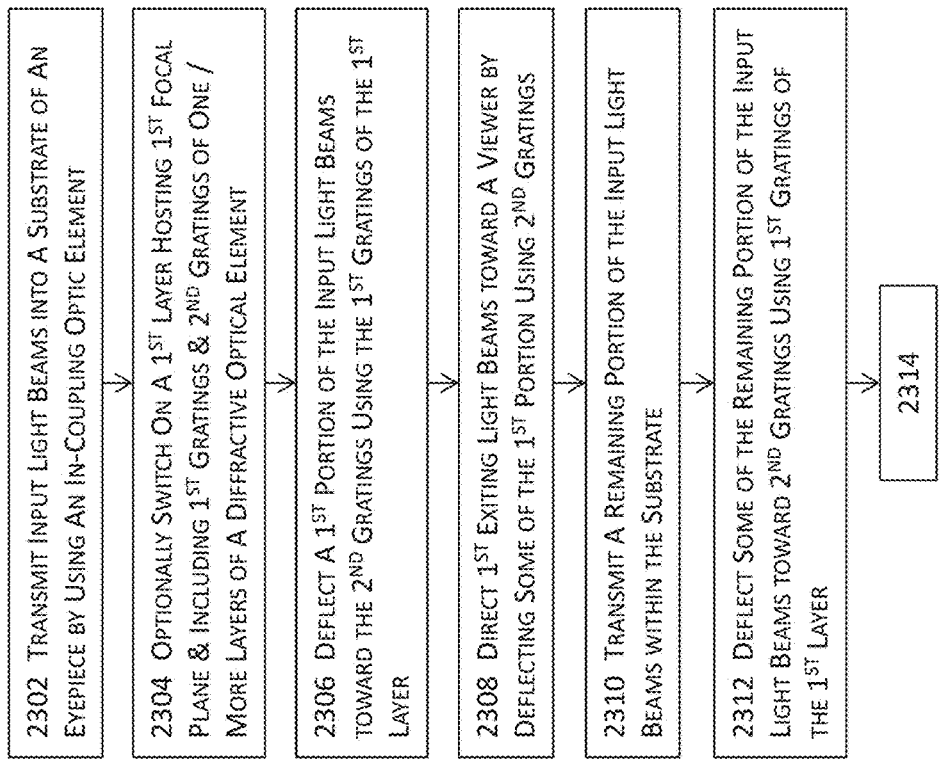
FIGS. 23B-C jointly illustrate a more detailed flow diagram for a process of generating stereoscopic images for virtual reality and/or augmented reality in some embodiments.
Figure 23C:
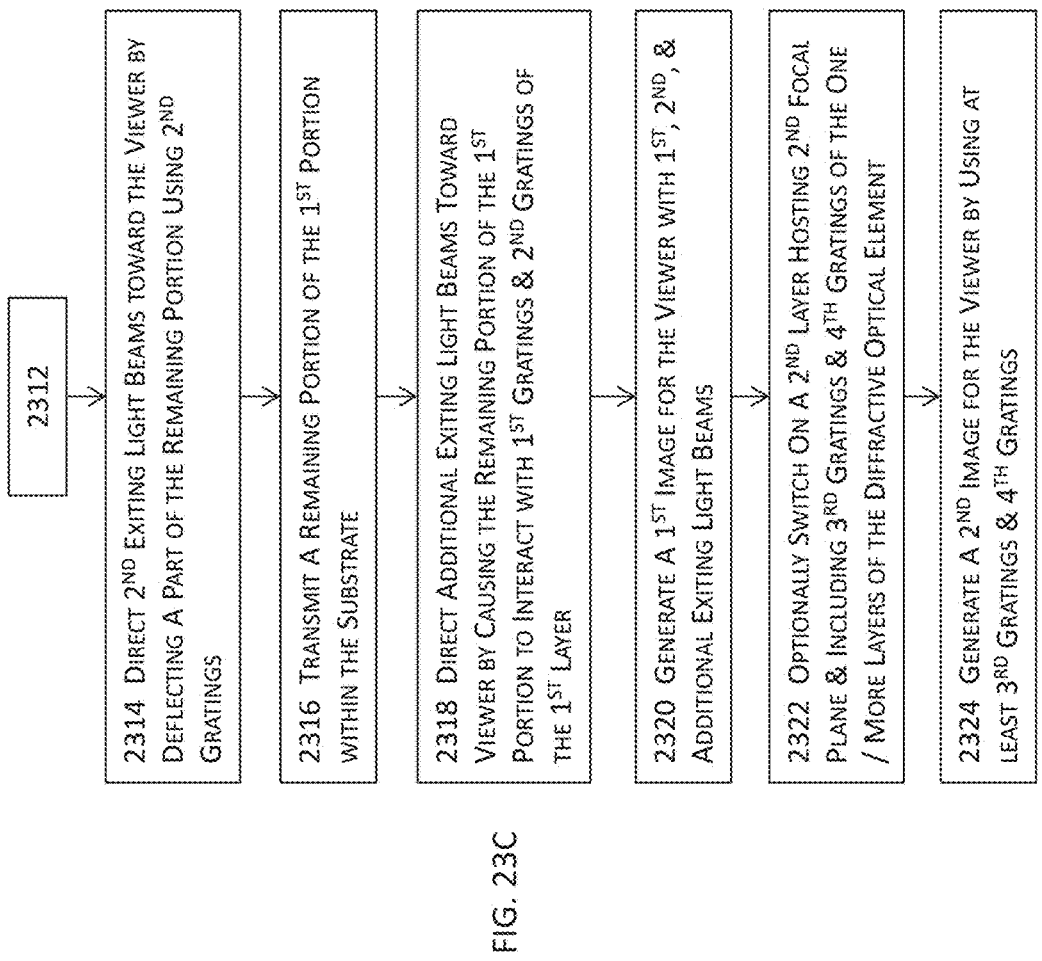

FIGS. 23B-C jointly illustrate a more detailed flow diagram for a process of generating stereoscopic images for virtual reality and/or augmented reality in some embodiments. In some embodiments, the process may first transmit input light beams into a substrate of an eyepiece at 2302. For example, the process may involve transmitting light beams from a projector through one or more fibers to an in-coupling optic element described above with reference to at least FIG. 5, and the in-coupling optic element further relays the input light beams to the substrate of an eyepiece via, for example, refraction. The process may further optionally switch on a first layer of one or more layers of a diffractive optical element (DOE) at 2304.

The first layer includes the first diffractive elements (e.g., OPE diffractive elements described above) and the second diffractive elements (e.g., EPE diffractive elements described above). The first diffractive elements and the second diffractive elements may be arranged in a co-planar or side-by-side manner or a folded or overlaid manner in some embodiments. In some other embodiments, the first diffractive elements and the second diffractive elements may be fabricated and co-exist in a multiplexed manner on a single layer of film as described in some of the preceding paragraphs. The DOE may include multiple such layers that are stacked on top of each other to form a multi-planar DOE as described earlier.

The first diffractive elements and second diffractive elements may include the surface-relief type diffractive elements, the volumetric-phase type diffractive elements, or a combination thereof. The first diffractive elements or the second diffractive elements may include both linear diffractive elements and circular or radially symmetric diffractive elements to deflect as well as focus input light beams. With both the linear diffractive elements and the circular or radially symmetric diffractive elements, the first layer may therefore host a first focal plane associated with a first focal length such that an image of an object created by the light beams deflected from the first layer may appear to be at the focal length to a user's eye(s) as if the user is observing the object that were physically located at the location defined by the focal length in real world.

In some embodiments, the DOE may include multiple layers, each hosting its own focal plane with a unique focal length. Each of these multiple layers may comprise a switchable layer that may be switched on and off by using control signals. At 2306, the process may deflect a first portion of the input light beams toward the second diffractive elements by using the first diffractive elements in the first layer. For example, the process may use the OPE diffractive elements described earlier to deflect a portion of the input light beams toward the EPE diffractive elements.

The process may then direct the first exiting light beams toward a user's eye via the eyepiece by deflecting some of the first portion of input light beams with the second diffractive elements at 2308. For example, the process may use the EPE diffractive elements described earlier to deflect a portion of the input light beams deflected from the OPE diffractive elements toward the user's eye. At 2310, the process may further transmit the remaining portion of the input light beams that is not deflected to the second diffractive elements within the substrate of the eyepiece. The amount of the remaining portion of the input light beams depends on the diffraction efficiency, the refraction indices, desired or required uniformity of the final output light beams, the diffractive elements involved, or any other pertinent factors.

The process may further deflect some of the remaining portion of the input light beams toward the second diffractive elements by using the first diffractive elements of the first layer at 2312. For example, some of the input light beams that continue to propagate within the substrate of the eyepiece due to the transmissive property of the first diffractive elements may hit different portion of the first diffractive elements and be deflected by this different portion of the first diffractive elements toward the second diffractive elements due to the reflective property of the first diffractive elements. At 2314, the process may direct the second exiting light beams toward the user's eye(s) by deflecting some of the remaining portion of the input light beams with the second diffractive elements. For example, the process may use the EPE diffractive elements to deflect some of the incoming light beams from the OPE diffractive elements toward the user's eye(s) at 2314.

At 2316, the remaining portion of the first portion of input light beams continues to propagate with the substrate of the eyepiece via, for example, total internal reflection (TIR) due to the transmissive property of the second diffractive elements. At 2318, the remaining portion of the first portion of input light beams propagates within the substrate and thus interacts with both the first diffractive elements and the second diffractive elements. When some of the remaining portion hits the first diffractive elements, the first diffractive elements deflect the light beams toward the second diffractive elements which in turn deflect these light beams into the additional exiting light beams toward the viewer's eye(s). The process may then generate a first image for the viewer to perceive via the eyepiece with the first exiting light beams, the second exiting beams, and the additional exiting light beams at 2320.

In some embodiments where both the linear diffractive elements and the circular or radially symmetric diffractive elements are utilized, the first layer may therefore host a first focal plane associated with a first focal length such that the image of an object created by these exiting light beams deflected from the first layer may appear to be at the focal length to the viewer's eye(s) as if the viewer is observing the object that were physically located at the location defined by the focal length in real world. An image may include a static image such as a picture or may be a dynamic image such as a part of a motion picture. At 2322, the process may further optionally switch a second layer that hosts a second focal plane with a second focal length. A second image for the view may be generated at 2324 by using at least the third diffractive elements and the fourth diffractive elements.

The second layer may include its own third diffractive elements and fourth diffractive elements such as the OPE diffractive elements and the EPE diffractive elements described above. The process may then repeat the steps of 2302 through 2320 to generate a second image of an object for the viewer as described immediately above. The second image may appear to be at the second focal length to the viewer's eye(s) as if the viewer is observing the object that were physically located at the location defined by the second focal length in real world. In some of these embodiments illustrated in FIG. 23, these multiple layers of the diffractive optical element may be dynamically switchable at a rate ranging from one or higher kilohertz (KHz) to hundreds of megahertz (MHz) to facilitate the focus state on a line-by-line basis or on a pixel-by-pixel basis. These multiple layers may include PDLC layers and may be switched on and off by using control signals to change the focal planes of the produced images. This illustrative multi-layer approach may also operatively coupled to a rapidly switching in-coupling optics (ICO) 1206D that may be further operatively coupled to a light source such as a fiber, a bundle of fibers, a multi-fiber projector, or a pico-projector, etc.

Figure 24A:
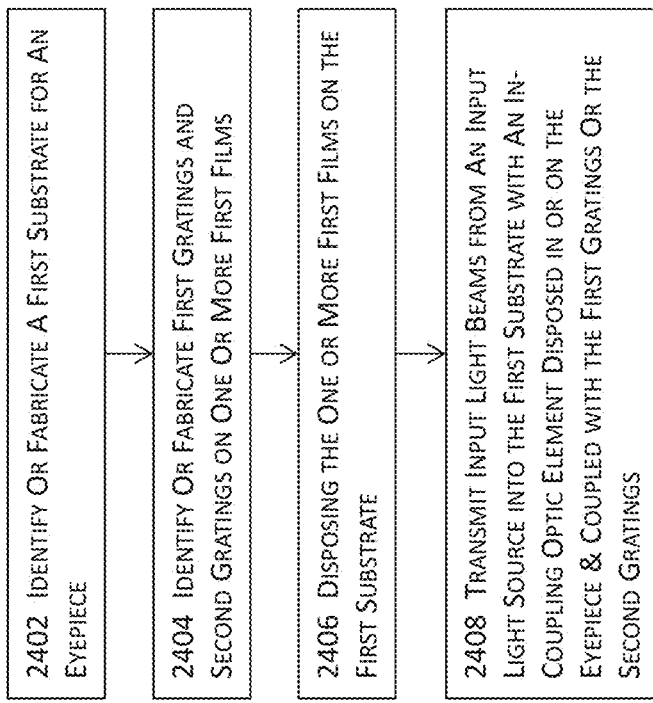
FIG. 24A illustrates a high level block diagram for a process of generating stereoscopic images for virtual reality and/or augmented reality in one or more embodiments.

FIG. 24A illustrates a high level block diagram for a process of generating stereoscopic images for virtual reality and/or augmented reality in one or more embodiments. A first substrate for an eye piece may be identified (if already existing) or fabricated (if non-existent) for an eyepiece at 2402. In some of these one or more embodiments, a first substrate may include a translucent or transparent dielectric material having a single layer or multiple layers. The first diffractive elements and the second diffractive elements may be identified (if already existing) or fabricated (if non-existent) on or in one or more first films at 2404. A film comprises a sheet of material whose thickness is smaller than a predetermined percentage of the length or width of the material in some embodiments.

In some of these embodiments, the first diffractive elements comprise exit pupil expansion (EPE) structures or diffractive elements or exit pupil expanders. In some of these embodiments, the second diffractive elements comprise exit orthogonal pupil expansion (OPE) structures or diffractive elements or orthogonal pupil expanders. The one or more films may then be disposed on the first substrate at 2406 in some embodiments. In some other embodiments, the one or more films accommodating the first diffractive elements and the second diffractive elements may be identified at 2406 on the first substrate. With the one or more first films accommodating the first and second diffractive elements and disposed on the first substrate, input light beams may be transmitted at 2408 from an input light source into the first substrate. In some of these embodiments, the input light source comprises an in-coupling optic element disposed in or on the eyepiece and coupled with the first diffractive elements or the second diffractive elements.

Figure 24B:
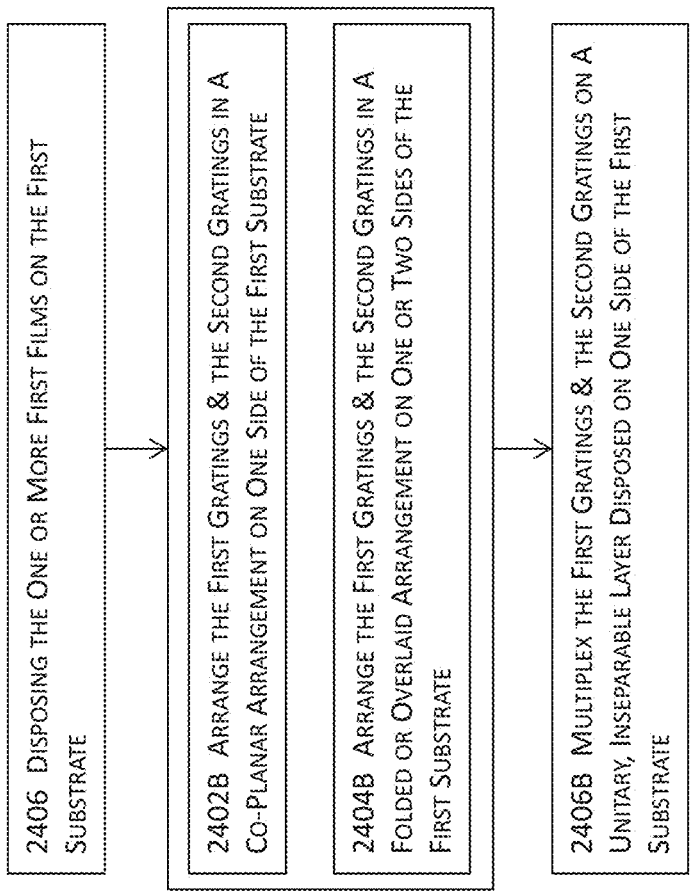
FIG. 24B illustrates a more detailed block diagram for the process of generating stereoscopic images for virtual reality and/or augmented reality illustrated in FIG. 24A in one or more embodiments.

FIG. 24B illustrates a more detailed block diagram for the process of generating stereoscopic images for virtual reality and/or augmented reality illustrated in FIG. 24A in one or more embodiments. More specifically, FIG. 24B illustrates more details about the act of disposing the one or more first films on the first substrate. In some these embodiments, the first diffractive elements and the second diffractive elements may be identified or arranged at 2402B in a co-planar arrangement on one side of the first substrate. An example of this co-planar arrangement is illustrated in FIG. 7.

Alternatively, the first diffractive elements and the second diffractive elements may be identified or arranged at 2404B in a folded or partially or completely overlaid arrangement on one side or two sides of the first substrate. Some examples of this folded or overlaid arrangement are illustrated in 8-9, 10A-B, and 11. In some embodiments where the first diffractive elements and second diffractive elements are already implemented, the arrangement of the first diffractive elements and second diffractive elements may be identified at 2402B or 2404B. With the arrangement of the first and second diffractive elements identified or devised on a unitary, inseparable layer disposed on one side of the first substrate, the first diffractive elements and the second diffractive elements may be multiplexed at 2406B.

Figure 24C:
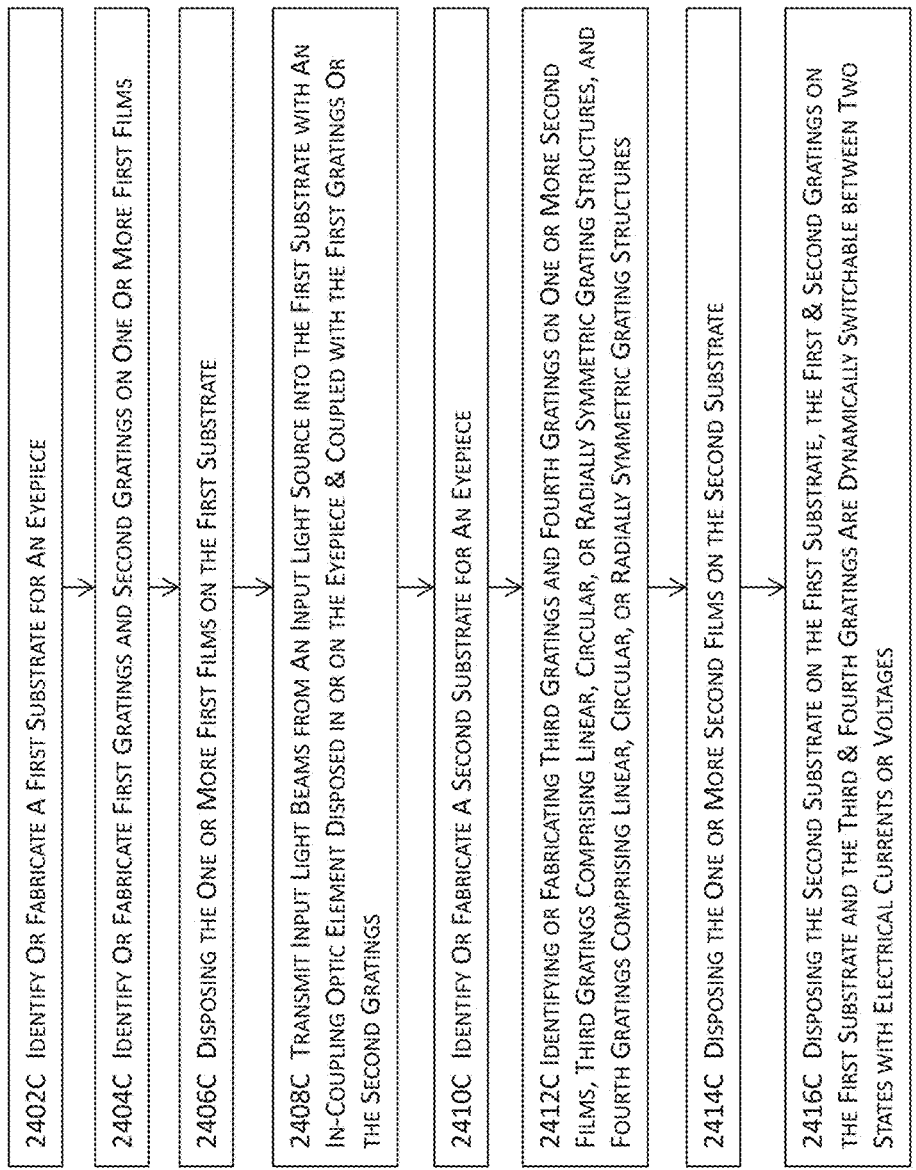
FIG. 24C illustrates a more detailed block diagram for a process of generating stereoscopic images for virtual reality and/or augmented reality in one or more embodiments.

FIG. 24C illustrates a more detailed block diagram for a process of generating stereoscopic images for virtual reality and/or augmented reality in one or more embodiments. In these embodiments, a first substrate for an eyepiece may be identified (if already existing) or fabricated (if not yet devised) at 2402C. The first diffractive elements and the second diffractive elements may also be identified (if already existing) or fabricated (if not yet devised) on one or more first films at 2404C. That is, the first and second diffractive elements may be devised in a single film or layer of material in some of these embodiments by using, for example, volumetric phase recording techniques, surface-relief type diffractive element techniques, or a combination of both the volumetric phase recording techniques and the surface-relief type diffractive element techniques.

Alternatively, the first diffractive elements and the second diffractive elements may be devised on two or more separate layers or films that are optically coupled with each other. For example, the first diffractive elements may be devised on a first film, and the second diffractive elements may be devised on a second film in some of these embodiments. At 2406C, the one or more first films accommodating the first and second diffractive elements may be disposed on the first substrate. Input light beams from an input light source including, for example, an in-coupling optic element or device may be transmitted into the first substrate at 2408C. The input light source may be disposed in or on the eyepiece and may also be coupled with the first diffractive elements, the second diffractive elements, or a combination of both the first and second diffractive elements. A second substrate may similarly be identified or fabricated for the eyepiece at 2410C as the first substrate is at 2402C.

The third diffractive elements and the fourth diffractive elements may also be identified (if already existing) or fabricated (if not yet devised) on one or more first films at 2412C. That is, the third and fourth diffractive elements may be devised in a single film or layer of material in some of these embodiments by using, for example, volumetric phase recording techniques, surface-relief type diffractive element techniques, or a combination of both the volumetric phase recording techniques and the surface-relief type diffractive element techniques.

Alternatively, the third diffractive elements and the fourth diffractive elements may be devised on two or more separate layers or films that are optically coupled with each other. For example, the third diffractive elements may be devised on a third film, and the fourth diffractive elements may be devised on a fourth film in some of these embodiments. In some of these embodiments, the third diffractive elements may comprise linear, circular, radially symmetric, or any combinations of linear, circuit, or radially symmetric diffractive elements. In addition or in the alternative, the fourth diffractive elements may include linear, circular, radially symmetric, or any combinations of linear, circuit, or radially symmetric diffractive elements while the third and fourth diffractive elements are different from each other.

The one or more second films may be disposed or identified on the second substrate at 2414C. The second substrate may further be disposed on the first substrate at 2416C. In some embodiments, the first and second diffractive elements on the first substrate may be dynamically switchable between two states (e.g., on and off states) by using, for example, electrical currents or voltages. In addition or in the alternative, the third and fourth diffractive elements on the first substrate may be dynamically switchable between two states (e.g., on and off states) also by using, for example, electrical currents or voltages. Dynamically switchable diffractive elements may enable time-multiplexed distribution of projected images to multiple focal-plane imaging elements. The switch rate may range from one kilohertz (1 KHz) to hundreds of megahertz (MHz) to facilitate the focus state on a line-by-line basis or on a pixel-by-pixel basis.

Figure 25A:
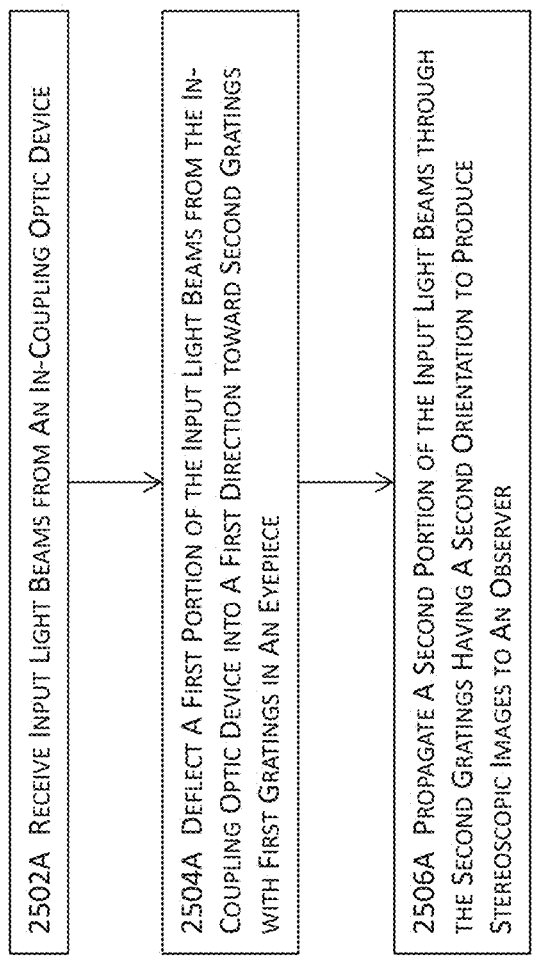
FIG. 25A illustrates a high level block diagram for generating stereoscopic images for virtual reality and/or augmented reality in one or more embodiments.
Figure 25B:
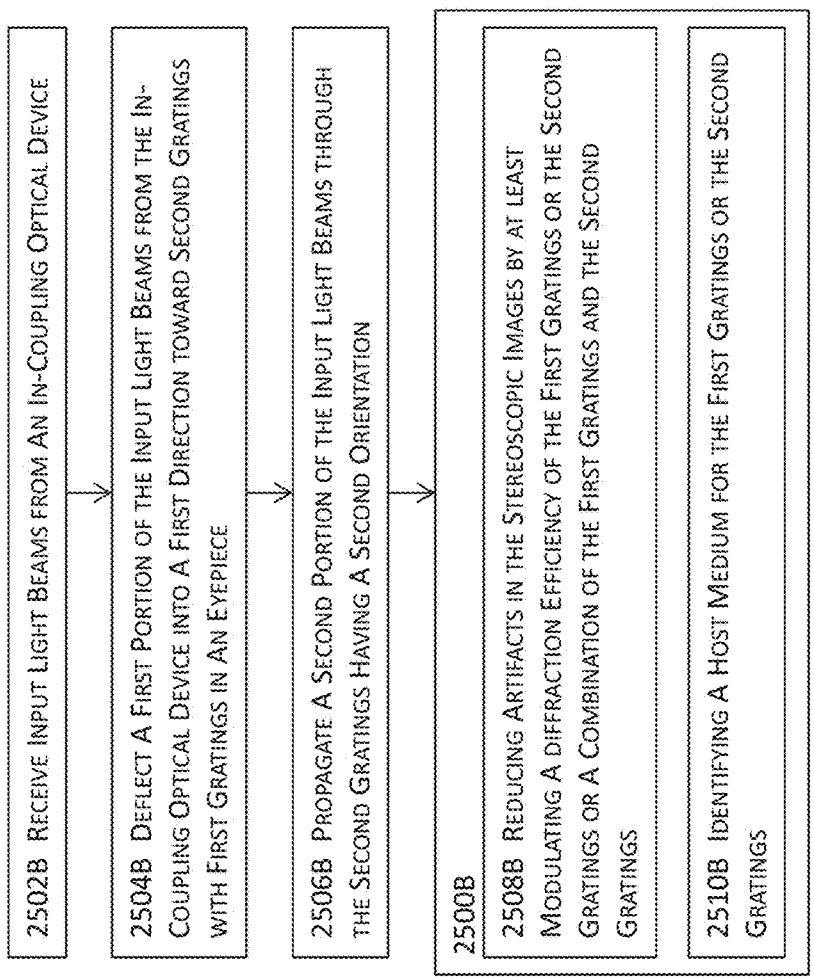
Figure 25D:
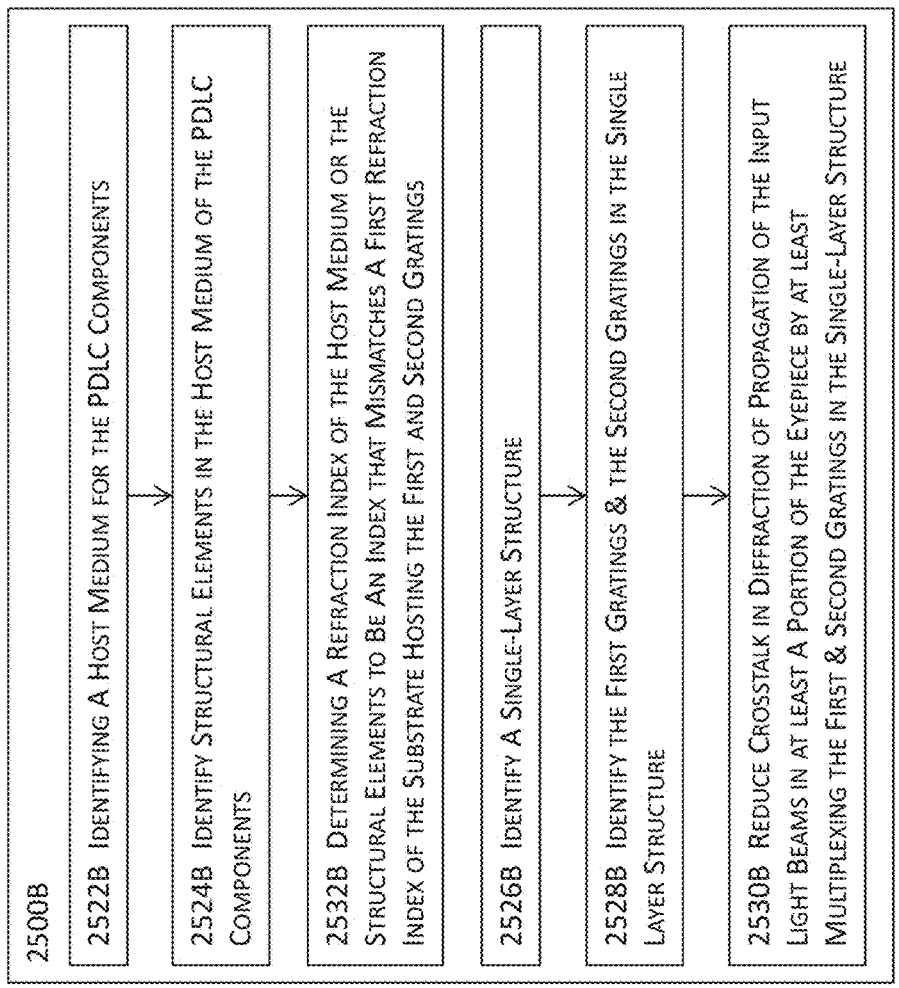

FIG. 25A illustrates a high level block diagram for generating stereoscopic images for virtual reality and/or augmented reality in one or more embodiments. More specifically, FIG. 25A together with FIGS. 25B-D illustrate more details about propagating input light beams through diffractive elements to produce stereoscopic images for virtual reality and/or augmented reality. In these one or more embodiments, input light beams may be received at 2502A from an input light source including, for example, an in-coupling optic element or device.

In some embodiments, the first diffractive elements may be arranged at a first orientation that forms an acute or obtuse angle with respect to the incident direction of the input light beams. The first portion of the input light beams propagated from the input light source into the first diffractive elements may be deflected at 2504A with the first diffractive elements toward the second diffractive elements in the eyepiece. In some embodiments, the first diffractive elements may include the exit pupil expansion (EPE) diffractive elements or expanders, and the second diffractive elements may include the orthogonal pupil expansion (OPE) diffractive elements or expanders.

A second portion of the input light beams may be propagated through the second diffractive elements having a second orientation different from the first orientation to produce the stereoscopic images to an observer at 2506A. In some embodiments, the ratio between the first portion and the second portion may be determined based in part or in whole upon the transmissive and reflective properties of the first or second diffractive elements. In some embodiments, the second portion may constitute the remaining portion of the input light beams exiting the input light source and may propagate through the second diffractive elements via total internal reflection (TIR).

FIGS. 25B-D jointly illustrate some additional, optional acts 2500B that may be individually performed or jointly performed in one or more groups for the process of generating stereoscopic images for virtual reality and/or augmented reality illustrated in FIG. 25A. It shall be noted that some of the acts illustrated in FIGS. 25B-D may be individually performed and thus are not connected to other acts with arrowheads in FIGS. 25B-D. In these embodiments, input light beams may be received at 2502B from an input light source including, for example, an in-coupling optic element or device as similarly described above with reference to FIG. 25A.

The first portion of the input light beams propagated from the input light source into the first diffractive elements may be deflected at 2504B with the first diffractive elements toward the second diffractive elements in the eyepiece. A second portion of the input light beams may be propagated through the second diffractive elements having a second orientation different from the first orientation to produce the stereoscopic images to an observer at 2506B. During any point in time between receiving the input light beams at 2502B and finally producing the stereoscopic images at 2506B, one or more of the additional, optional acts 2500B may be performed. For example, artifacts in the stereoscopic images may be reduced by at least modulating the diffraction efficiency of the first diffractive elements or the second diffractive elements or a combination of the first and second diffractive elements at 2508B in some embodiments.

A host medium for the first diffractive elements and/or the second diffractive elements may be identified at 2510B. In some embodiments, the host medium may include at least one of a dry-process photopolymer material, a single-layer silver halides, or single-layer polymer-dispersed liquid crystal mixture material. Propagation of the input light beams may be guided at 2512B by at least successively redirecting the first light wave-fronts of at least the first portion of the input light beams with the first diffractive elements.

Propagation of the input light beams may be further guided at 2512B by out-coupling the redirected first light wave-fronts with at least the second portion of the input light beams that propagate through the second diffractive elements. The earlier part and later part of interactions (in terms of temporal or spatial order) between the input light beams and the first and/or the second diffractive elements may be controlled at 2514B by at least ramping a diffraction efficiency of one or more components in the eyepiece with different diffraction efficiencies. In these embodiments, the diffraction efficiency of the eyepiece components may be ramped such that the initial interaction between the light rays and the structures use less of the available light than later interactions to reduce or eliminate the reduction in image field brightness distribution across the eyepiece as the light propagates.

A grating diffraction efficiency may also be distributed at 2516B for the first and/or the second diffractive elements by at least modulating the recording beam intensities or a ratio of the recording beam intensities in preparing the first and/or the second diffractive elements. Time-multiplexed distribution of projected images may be provided at 2518B to multiple focal-plane image elements by using switchable diffractive elements for the first and/or the second diffractive elements. In some embodiments, polymer-dispersed liquid crystal (PDLC) components may be identified at 2520B for the first and/or the second diffractive elements. In some embodiments involving the PDLC components, a host medium for the PDLC components may be identified at 2522B, and structural elements in the host medium of the PDLC components may be identified at 2524B.

A refraction index of the host medium or the structural elements may then be determined at 25328 to be an index that mismatches the refraction index of the substrate that accommodates the first diffractive elements and the second diffractive elements. That is the refraction index of the host medium or the structural elements may be different from the refraction index of the substrate in these embodiments. In some embodiments, a single-layer structure may be identified at 2526B, and the first diffractive elements and the second diffractive elements may be identified or devised at 2528B in the single-layer structure. With the single-layer structure, crosstalk in diffraction of the propagation of the input light beams in at least a portion of the eyepiece may be reduced at 2530B by at least multiplexing the first and the second diffractive elements in the single-layer structure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A method for generating stereoscopic images for virtual reality or augmented reality, comprising:
    transmitting input light beams having an incident direction and carrying image information of at least one stereoscopic image into a substrate of an eyepiece by using an in-coupling optic element;
    refracting, at the in-coupling optic element, the input light beams toward a first diffractive element;
    diffracting, with at least the first diffractive element, a first portion of the input light beams incident on a first portion of the first diffractive element to propagate in a diffracted direction that points to a portion of a second diffractive element on the eyepiece while allowing a remaining portion of the input light beams to continue to propagate in the incident direction within the substrate of the eyepiece and to interact with a different portion of the second diffractive element, wherein the first diffractive element and the second diffractive element are disposed on two opposing sides of the substrate; and projecting exiting light beams with an output light beam density for the at least one stereoscopic image to at least one eye of a viewer with the second diffractive element to diffract some of the first portion of the input light beams that is diffracted by the first diffractive element to the second diffractive element as the exiting light beams and to direct a remaining portion of the first portion incident on the second diffractive element in a direction to continue to propagate within the substrate, wherein the output light beam density is configured based at least part upon degrees of spatial overlapping between the first and second diffractive elements, or the output light beam intensity is increased by embedding a beam-splitting surface in the substrate and or by being sandwiched between the substrate and another substrate to split at least a part of the input light beams into a plurality of portions comprising a transmitted portion and a reflected portion, the first diffractive elements and the second diffractive elements are configured to comprise diffractive structures of both a volumetric type and a surface relief type, rather than the volumetric type of diffractive structures alone or the surface-relief type of diffractive structures alone, and the first and second diffractive elements are disposed on or in one or more transparent or translucent optical components.

2. The method of claim 1, further comprising:
transmitting a remaining portion of the input light beams within the substrate of the eyepiece;
diffracting some of the remaining portion of the input light beams toward the second diffractive element by using the first diffractive element; and
directing second exiting light beams toward the viewer by diffracting a part of the remaining portion of the input light beams with the second diffractive element.

3. The method of claim 1, further comprising:
transmitting a remaining portion of the first portion of the input light beams within the substrate of the eyepiece; and
directing additional exiting light beams toward the viewer by causing the remaining portion of the first portion to be diffracted with the first diffractive element and the second diffractive element.

4. The method of claim 1, further comprising:
providing the substrate with the first and second diffractive optical elements as a first layer unit;
providing at least a second substrate with third diffractive element and fourth diffractive element disposed on opposite side of the second substrate, as a second layer unit;
stacking the first layer unit and the at least second layer unit on each other to form a multi-planar configuration; and
dynamically switching on the first layer unit project the exiting light beams to form the at least one stereoscopic image at a first focal plane; or
dynamically switching on at least the second layer unit, to diffract a first portion of the input light beams incident on the third diffractive element to propagate in a diffracted direction to a portion of the fourth diffractive element while allowing a remaining portion of the input light beams to continue to propagate in the incident direction within the second substrate and to interact with a different portion of the fourth diffractive element and to project exiting light beams with the fourth diffractive optical element by diffracting some of the first portion of the input light beams, diffracted by the third diffractive element to the fourth diffractive element, toward the at least one eye of the viewer and directing a remaining portion of the first portion of the input light beams in a direction to propagate within the second substrate, wherein the exiting light beams form the at least one stereoscopic image at a second focal plane.

5. The method of claim 4, wherein the third diffractive element and the fourth diffractive element on at least the second substrate comprise a combination of surface-relief type diffractive elements and volumetric-phase type diffractive elements.

6. An apparatus for generating stereoscopic images for virtual reality and/or augmented reality, comprising:
an eyepiece including a substrate;
an in-coupling optic element to refract input light beams having an incident direction and carrying image information of at least one stereoscopic image into the substrate; and
the substrate comprising first diffractive element and second diffractive element that are operatively coupled to the in-coupling optic element, wherein
the first diffractive element and the second diffractive element are disposed on two opposing sides of the substrate,
the first diffractive element is configured to diffract a first portion of the input light beams incident on at least a portion of the first diffractive element to propagate in a diffracted direction that points to a portion of second diffractive element while allowing a remaining portion of the input light beams to continue to propagate in the incident direction within the substrate of the eyepiece and to interact with a different portion of the second diffractive element,
the second diffractive element is configured to project exiting light beams with an output light beam density for the at least one stereoscopic image to at least one eye of a viewer at least by diffracting some of the first portion of the input light beams that is diffracted by the first diffractive element as exiting light beams toward the at least one eye of the viewer and directing a remaining portion of the first portion incident on at least one portion of the second diffractive element in a direction to propagate within the substrate,
the output light beam density is configured based at least in part on a degree of spatial overlapping between the first and second diffractive elements or an output light beam intensity is increased by embedding a beam-splitting surface in the substrate or sandwiching the beam-splitting surface between the substrate and another substrate to split at least a part of the input light beams into a plurality of portions comprising a transmitted portion and a reflected portion,
the first and second diffractive elements are configured so each comprises diffractive structures of both a volumetric type and a surface relief type, rather than the volumetric type of diffractive structures alone or the surface-relief type of diffractive structures alone.

7. The apparatus of claim 6, wherein the first diffractive element and the second diffractive element are configured to comprise both a plurality of linear diffractive elements and a plurality of circular or radially symmetric diffractive elements.

8. The apparatus of claim 6, wherein the first diffractive element and the second diffractive element are arranged in a folded or overlaid arrangement on both sides of the substrate.

9. The apparatus of claim 6, further comprising:
a multi-layer configuration that is comprised of a stack of
  a first layer unit, including the substrate, the first diffractive element and the second diffractive element and at least one second layer unit, and a controller to selectively and dynamically switch on/off of the first and the at least one second layer unit, wherein
  the at least one second layer unit further comprises a second substrate with third diffractive element and fourth diffractive element disposed on opposite side of the second substrate,
  when the second layer unit is dynamically switched on, the third diffractive element is configured to diffract a first portion of the input light beams incident on at least a portion of the third diffractive element to propagate in a diffracted direction that points to a portion of the fourth diffractive element while allowing a remaining portion of the input light beams to continue to propagate in the incident direction within the second substrate and to interact with a different portion of the fourth diffractive element,
  the fourth diffractive element is configured to project exiting light beams with an output light beam density for the at least one stereoscopic image to the at least one eye of the viewer at least by diffracting some of the first portion of the input light beams that is diffracted by the third diffractive element toward the at least one eye of the viewer and directing a remaining portion of the first portion incident on the at least one portion of the fourth diffractive element in a direction propagating within the substrate, and
  the first layer unit and the second layer unit each projects exiting light to form the image at different focal planes.

10. The apparatus of claim 9, where the first layer unit and the at least one second layer unit include at least one polymer-dispersed liquid crystal layer.

11. The apparatus of claim 6, wherein the first diffractive element and the second diffractive element include both surface-relief type diffractive elements and volumetric-phase type diffractive elements both of which are arranged in a folded configuration.

* * * * *